US012307990B2

(12) United States Patent
Zhang et al.

(10) Patent No.: US 12,307,990 B2
(45) Date of Patent: May 20, 2025

(54) MICROFLUIDIC PIXEL DRIVING CIRCUIT, MICROFLUIDIC SUBSTRATE, AND MICROFLUIDIC CHIP

(71) Applicant: Shanghai Tianma Microelectronics Co., Ltd., Shanghai (CN)

(72) Inventors: Kaidi Zhang, Shanghai (CN); Baiquan Lin, Shanghai (CN); Yunfei Bai, Shanghai (CN); Wei Li, Shanghai (CN); Kerui Xi, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 0 days.

(21) Appl. No.: 18/387,304

(22) Filed: Nov. 6, 2023

(65) Prior Publication Data

US 2024/0071325 A1 Feb. 29, 2024

(30) Foreign Application Priority Data

Nov. 11, 2022 (CN) ......................... 202211412131.1

(51) Int. Cl.
*G09G 3/34* (2006.01)

(52) U.S. Cl.
CPC ..... *G09G 3/348* (2013.01); *G09G 2310/0267* (2013.01); *G09G 2310/0275* (2013.01)

(58) Field of Classification Search
CPC ........... G09G 3/348; G09G 2310/0267; G09G 2310/0275
See application file for complete search history.

(56) References Cited

U.S. PATENT DOCUMENTS

2020/0316590 A1* 10/2020 Xi ....................... H01L 27/1255
2020/0316591 A1* 10/2020 Xi ......................... G09G 3/348

FOREIGN PATENT DOCUMENTS

CN 206313448 7/2017
CN 113674706 A 11/2021

* cited by examiner

*Primary Examiner* — Stephen G Sherman
(74) *Attorney, Agent, or Firm* — KDW Firm PLLC

(57) ABSTRACT

Provided a microfluidic pixel driving circuit includes n boost modules, where each boost module includes a capacitor and a write unit, and n is a positive integer greater than or equal to 2; a first terminal of a first capacitor is electrically connected to a fixed potential line, a second terminal of the first capacitor is electrically connected to a pixel electrode, and the first capacitor is used for storing a voltage of the pixel electrode; a first write unit is configured to write a first data signal to the pixel electrode according to an enable level of a first scan signal; a first terminal of a second capacitor is electrically connected to the pixel electrode; and a second write unit is configured to write a second data signal to a second terminal of the second capacitor according to an enable level of a second scan signal.

16 Claims, 18 Drawing Sheets

MICROFLUIDIC PIXEL DRIVING CIRCUIT, MICROFLUIDIC SUBSTRATE, AND MICROFLUIDIC CHIP

CROSS-REFERENCE TO RELATED APPLICATION(S)

This application claims priority to Chinese Patent Application No. 202211412131.1 filed Nov. 11, 2022, the disclosure of which is incorporated herein by reference in its entirety.

TECHNICAL FIELD

The present disclosure relates to the field of display technology and, in particular, to a microfluidic pixel driving circuit, a microfluidic substrate, and a microfluidic chip.

BACKGROUND

A microfluidic chip has strong integrity and has a fast analysis speed, a low loss, low material consumption, and small pollution when used for processing samples. Therefore, the microfluidic chip is widely applied in many fields such as biomedical research, drug synthesis and screening, environmental monitoring and protection, health quarantine, judicial identification, and the detection of biological reagents.

An existing microfluidic chip is mainly used for driving a droplet to flow. A microfluidic pixel driving circuit working in the microfluidic chip requires a relatively high drive voltage, which poses a challenge to a driver chip for the microfluidic chip.

SUMMARY

The present disclosure provides a microfluidic pixel driving circuit, a microfluidic substrate, and a microfluidic chip.

A microfluidic pixel driving circuit includes n boost modules, where each of the n boost modules includes a capacitor and a write unit, a capacitor in a first boost module of the n boost modules is denoted as a first capacitor, a write unit in the first one of the n boost modules is denoted as a first write unit, a capacitor in a second boost module of the n boost modules is denoted as a second capacitor, a write unit in the second one of the n boost modules is denoted as a second write unit, and n is a positive integer greater than or equal to 2. A first terminal of the first capacitor is electrically connected to a fixed potential line, a second terminal of the first capacitor is electrically connected to a pixel electrode, and the first capacitor is used for storing a voltage of the pixel electrode. The first write unit is configured to write a first data signal to the pixel electrode according to an enable level of a first scan signal. A first terminal of the second capacitor is electrically connected to the pixel electrode. The second write unit is configured to write a second data signal to a second terminal of the second capacitor according to an enable level of a second scan signal.

A microfluidic substrate includes a substrate and a pixel unit on a side of the substrate. The pixel unit includes a microfluidic pixel driving circuit and a pixel electrode, where the microfluidic pixel driving circuit is electrically connected to the pixel electrode, and includes n boost modules, where each of the n boost modules includes a capacitor and a write unit, a capacitor in a first boost module of the n boost modules is denoted as a first capacitor, a write unit in the first one of the n boost modules is denoted as a first write unit, a capacitor in a second boost module of the n boost modules is denoted as a second capacitor, a write unit in the second one of the n boost modules is denoted as a second write unit, and n is a positive integer greater than or equal to 2. A first terminal of the first capacitor is electrically connected to a fixed potential line, a second terminal of the first capacitor is electrically connected to a pixel electrode, and the first capacitor is used for storing a voltage of the pixel electrode. The first write unit is configured to write a first data signal to the pixel electrode according to an enable level of a first scan signal. A first terminal of the second capacitor is electrically connected to the pixel electrode. The second write unit is configured to write a second data signal to a second terminal of the second capacitor according to an enable level of a second scan signal.

A microfluidic chip includes a microfluidic substrate, an opposing substrate, and a channel layer, where the channel layer is disposed between the opposing substrate and the microfluidic substrate and used for accommodating a droplet. The microfluidic substrate includes a substrate and a pixel unit on a side of the substrate. The pixel unit includes a microfluidic pixel driving circuit and a pixel electrode, where the microfluidic pixel driving circuit is electrically connected to the pixel electrode, and includes n boost modules, where each of the n boost modules includes a capacitor and a write unit, a capacitor in a first boost module of the n boost modules is denoted as a first capacitor, a write unit in the first one of the n boost modules is denoted as a first write unit, a capacitor in a second boost module of the n boost modules is denoted as a second capacitor, a write unit in the second one of the n boost modules is denoted as a second write unit, and n is a positive integer greater than or equal to 2. A first terminal of the first capacitor is electrically connected to a fixed potential line, a second terminal of the first capacitor is electrically connected to a pixel electrode, and the first capacitor is used for storing a voltage of the pixel electrode. The first write unit is configured to write a first data signal to the pixel electrode according to an enable level of a first scan signal. A first terminal of the second capacitor is electrically connected to the pixel electrode. The second write unit is configured to write a second data signal to a second terminal of the second capacitor according to an enable level of a second scan signal.

DETAILED DESCRIPTION

Figure 1:
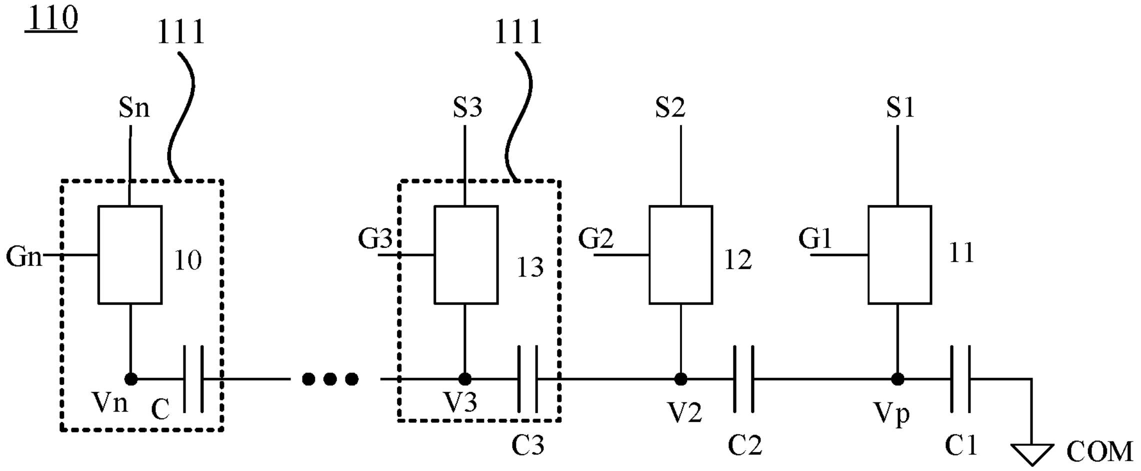
FIG. 1 is a circuit diagram of a microfluidic pixel driving circuit according to an embodiment of the present disclosure.

Hereinafter the present disclosure is further described in detail in conjunction with the drawings and embodiments. It is to be understood that the embodiments described herein are intended to illustrate and not to limit the present disclosure. Additionally, it is to be noted that, for ease of description, only part, not all, of structures related to the present disclosure are illustrated in the drawings.

FIG. 1 is a circuit diagram of a microfluidic pixel driving circuit according to an embodiment of the present disclosure. Referring to FIG. 1, a microfluidic pixel driving circuit 110 includes n boost modules 111. Each boost module 111 includes a capacitor C and a write unit 10. A capacitor C in a first boost module 111 of the n boost modules 111 is denoted as a first capacitor C1, and a write unit 10 in the first boost module 111 is denoted as a first write unit 11. A capacitor C in a second boost module 111 of the n boost modules 111 is denoted as a second capacitor C2, and a write unit 10 in the second boost module 111 is denoted as a second write unit 12, where n is a positive integer greater than or equal to 2.

A first terminal of the first capacitor C1 is electrically connected to a fixed potential line COM, and a second terminal of the first capacitor C1 is electrically connected to a pixel electrode (not shown in FIG. 1). The first capacitor C1 is used for storing a voltage of the pixel electrode, that is, the first capacitor C1 is used for storing a voltage of a first node Vp. The first write unit 11 is configured to write a first data signal S1 to the pixel electrode according to an enable level of a first scan signal G1. The enable level refers to a level for controlling the first write unit 11 to be turned on. A disable level is reverse to the enable level. Under the control of a disable level of the first scan signal G1, the first write unit 11 is turned off and the first write unit 11 cannot write the first data signal S1 to the pixel electrode.

A first terminal of the second capacitor C2 is electrically connected to the pixel electrode. The first terminal of the second capacitor C2 is connected to the first node Vp. A second terminal of the second capacitor C2 is connected to a second node V2. The second write unit 12 is configured to write a second data signal S2 to the second terminal of the second capacitor C2 according to an enable level of a second scan signal G2. Under the control of a disable level of the second scan signal G2, the second write unit 12 is turned off and the second write unit 12 cannot write the second data signal S2 to the pixel electrode. The second data signal S2 is different from the first data signal S1.

The embodiments of the present disclosure provide a microfluidic pixel driving circuit, where the microfluidic pixel driving circuit includes n boost modules 111, each boost module 111 includes a capacitor C and a write unit 10, and when the write unit 10 is turned on, a voltage written to the capacitor C can be fed to the pixel electrode so that the voltage written to the pixel electrode can be boosted. The multiple boost modules 111 can perform multi-stage boosting on the voltage written to the pixel electrode so that the voltage value of the pixel electrode is increased and the pixel electrode can drive, at a relatively high voltage, a droplet to flow without increasing the requirement on a driver chip.

Figure 2:
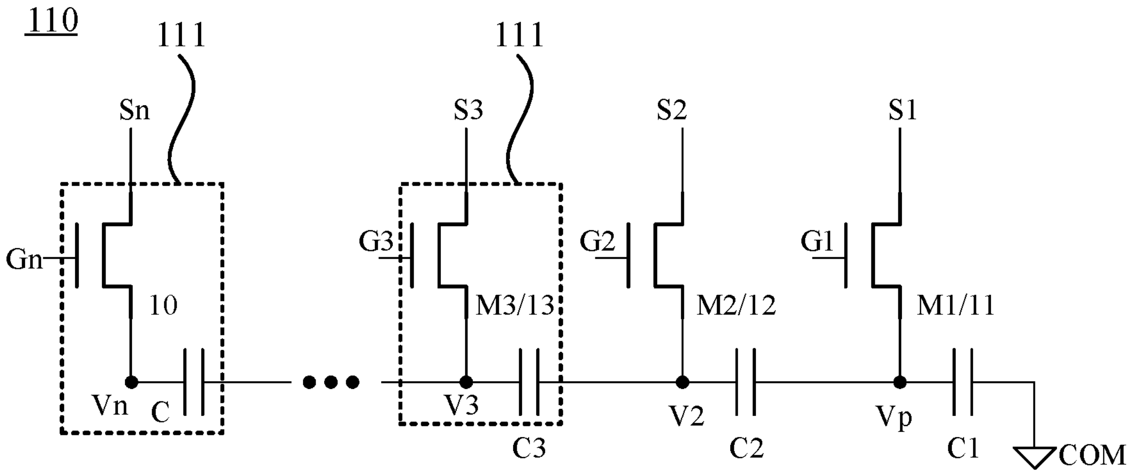
FIG. 2 is another circuit diagram of a microfluidic pixel driving circuit according to an embodiment of the present disclosure.

FIG. 2 is another circuit diagram of a microfluidic pixel driving circuit according to an embodiment of the present disclosure. Referring to FIG. 2, the first write unit 11 includes a first transistor M1, a gate of the first transistor M1 receives the first scan signal G1, a first electrode of the first transistor M1 is electrically connected to the pixel electrode, and a second electrode of the first transistor M1 receives the first data signal S1. When the enable level of the first scan signal G1 controls the first transistor M1 to be turned on, the first data signal S1 is transmitted to the first node Vp via the first transistor M1 and written to the pixel electrode, and the voltage of the pixel electrode is increased. The second write unit 12 includes a second transistor M2, a gate of the second transistor M2 receives the second scan signal G2, a first electrode of the second transistor M2 is electrically connected to the second terminal of the second capacitor C2, and a second electrode of the second transistor M2 receives the second data signal S2. When the enable level of the second scan signal G2 controls the second transistor M2 to be turned on, the second data signal S2 is transmitted to the second node V2 via the second transistor M2, a voltage of the second node V2 is increased and fed to the first node Vp through the second capacitor C2, and a voltage of the first node Vp is increased again so that the voltage of the pixel electrode is increased again.

The microfluidic pixel driving circuit further includes a third-stage boost module 111, where a capacitor C in the third-stage boost module 111 is denoted as a third capacitor C3 and a write unit 10 in the third-stage boost module 111 is denoted as a third write unit 13. A first terminal of the third capacitor C3 is electrically connected to the second terminal of the second capacitor C2. The first terminal of the third capacitor C3 is connected to the second node V2. A second terminal of the third capacitor C3 is connected to a third node V3. The third write unit 13 is configured to write a third data signal S3 to the second terminal of the third capacitor C3 according to an enable level of a third scan signal G3. Under the control of a disable level of the third scan signal G3, the third write unit 13 is turned off and the third write unit 13 cannot write the third data signal S3 to the pixel electrode. The third data signal S3 are different from the second data signal S2 and the first data signal S1.

In some embodiments, referring to FIG. 2, the third write unit 13 includes a third transistor M3, a gate of the third transistor M3 receives the third scan signal G3, a first electrode of the third transistor M3 is electrically connected to the second terminal of the third capacitor C3, and a second electrode of the third transistor M3 receives the third data signal S3. When the enable level of the third scan signal G3 controls the third transistor M3 to be turned on, the third data signal S3 is transmitted to the third node V3 via the third transistor M3, a voltage of the third node V3 is increased and fed to the second node V2 through the third capacitor C3, the voltage of the second node V2 is increased and fed to the first node Vp through the second capacitor C2, and the voltage of the first node Vp is increased so that the voltage of the pixel electrode is increased.

For example, a write unit 10 in an n-th boost module 111 may include a transistor, where a gate of the transistor configured to receive an n-th scan signal Gn, a first electrode of the transistor is connected to an n-th node Vn, and a second electrode of the transistor configured to receive an n-th data signal Sn. When an enable level of the n-th scan signal Gn controls the transistor to be turned on, the n-th data signal Sn is transmitted to the n-th node Vn, a voltage of the n-th node Vn is increased and fed to the first node Vp through multiple capacitors C in sequence, and the voltage of the first node Vp is increased for the n-th time so that the voltage of the pixel electrode is increased.

Figure 3:
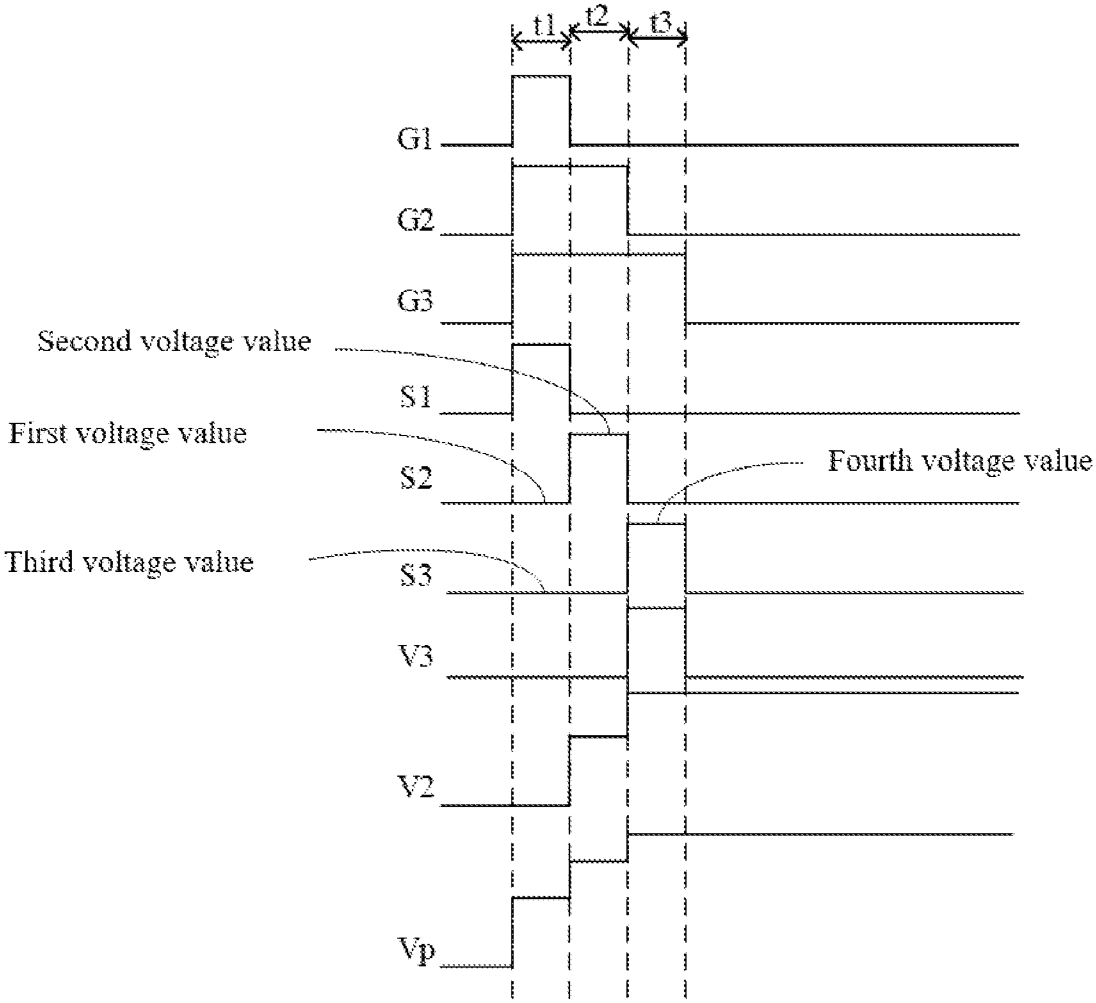
FIG. 3 is a drive timing diagram of a microfluidic pixel driving circuit according to an embodiment of the present disclosure.

FIG. 3 is a drive timing diagram of a microfluidic pixel driving circuit according to an embodiment of the present disclosure. Referring to FIGS. 1 to 3, the drive timing of the microfluidic pixel driving circuit includes a first period t1 and a second period t2 that are set in sequence. In the first period t1, the enable level of the first scan signal G1 is used to control the first write unit 11 to be turned on to write the first data signal S1 to the pixel electrode, and the voltage of the first node Vp corresponding to the pixel electrode is increased. In the first period t1, the enable level of the second scan signal G2 is used to control the second write unit 12 to be turned on to write a first voltage value of the second data signal S2 to the second terminal of the second capacitor C2, that is, to write the first voltage value of the second data signal S2 to the second node V2.

In the second period t2, the disable level of the first scan signal G1 is used to control the first write unit 11 to be turned off. The enable level of the second scan signal G2 is used to control the second write unit 12 to be turned on to write a second voltage value of the second data signal S2 to the second terminal of the second capacitor C2, that is, to write the second voltage value of the second data signal S2 to the second node V2. The second voltage value is greater than the first voltage value. Thus, the voltage value of the second node V2 is increased from the first voltage value to the second voltage value, the voltage of the second node V2 is increased and fed to the first node Vp through the second capacitor C2, and the voltage of the first node Vp is increased so that the voltage of the pixel electrode is increased.

In some embodiments, referring to FIGS. 1 to 3, the drive timing further includes a third period t3, where the third period t3 is after the second period t2, and the second period t2 is after the first period t1. In the first period t2 and the second period t2, the enable level of the third scan signal G3 is used to control the third write unit 13 to be turned on to write a third voltage value of the third data signal S3 to the second terminal of the third capacitor C3, that is, to write the third voltage value of the third data signal S3 to the third node V3.

In the third period t3, the disable level of the first scan signal G1 is used to control the first write unit 11 to be turned off, the disable level of the second scan signal G2 is used to control the second write unit 12 to be turned off, and the enable level of the third scan signal G3 is used to control the third write unit 13 to be turned on to write a fourth voltage value of the third data signal S3 to the second terminal of the third capacitor C3, that is, to write the fourth voltage value of the third data signal S3 to the third node V3. The fourth voltage value is greater than the third voltage value. Thus, the voltage value of the third node V3 is increased from the third voltage value to the fourth voltage value, the voltage of the third node V3 is increased and fed to the first node Vp through the third capacitor C3 and the second capacitor C2, and the voltage of the first node Vp is increased so that the voltage of the pixel electrode is increased.

Figure 4:
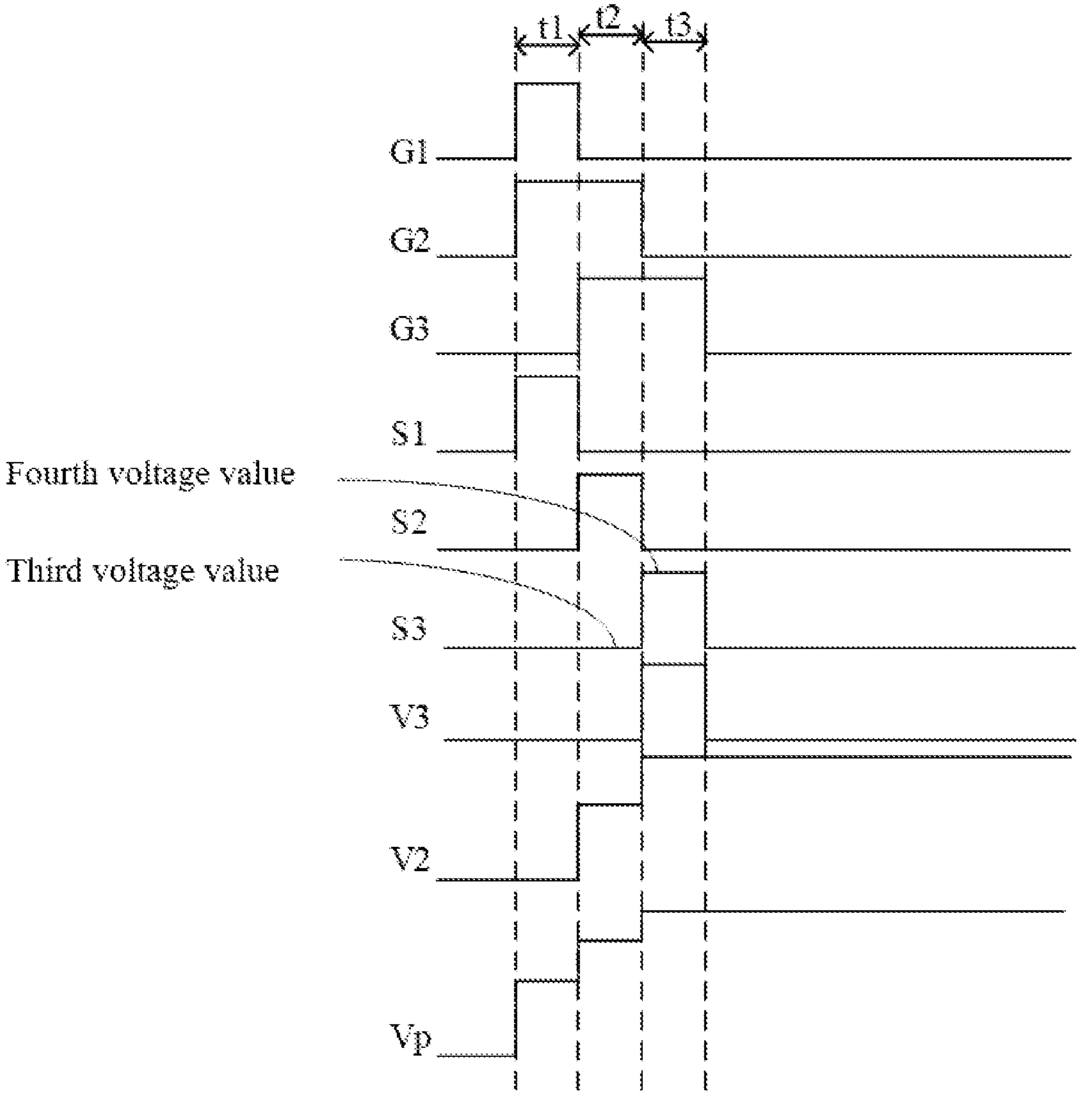
FIG. 4 is another drive timing diagram of a microfluidic pixel driving circuit according to an embodiment of the present disclosure.

FIG. 4 is another drive timing diagram of a microfluidic pixel driving circuit according to an embodiment of the present disclosure. Referring to FIGS. 1 and 4, in the first period t1, the disable level of the third scan signal G3 is used to control the third write unit 13 to be turned off. In the second period t2, the enable level of the third scan signal G3 is used to control the third write unit 13 to be turned on to write the third voltage value of the third data signal S3 to the second terminal of the third capacitor C3, that is, to write the third voltage value of the third data signal S3 to the third node V3.

Figure 5:
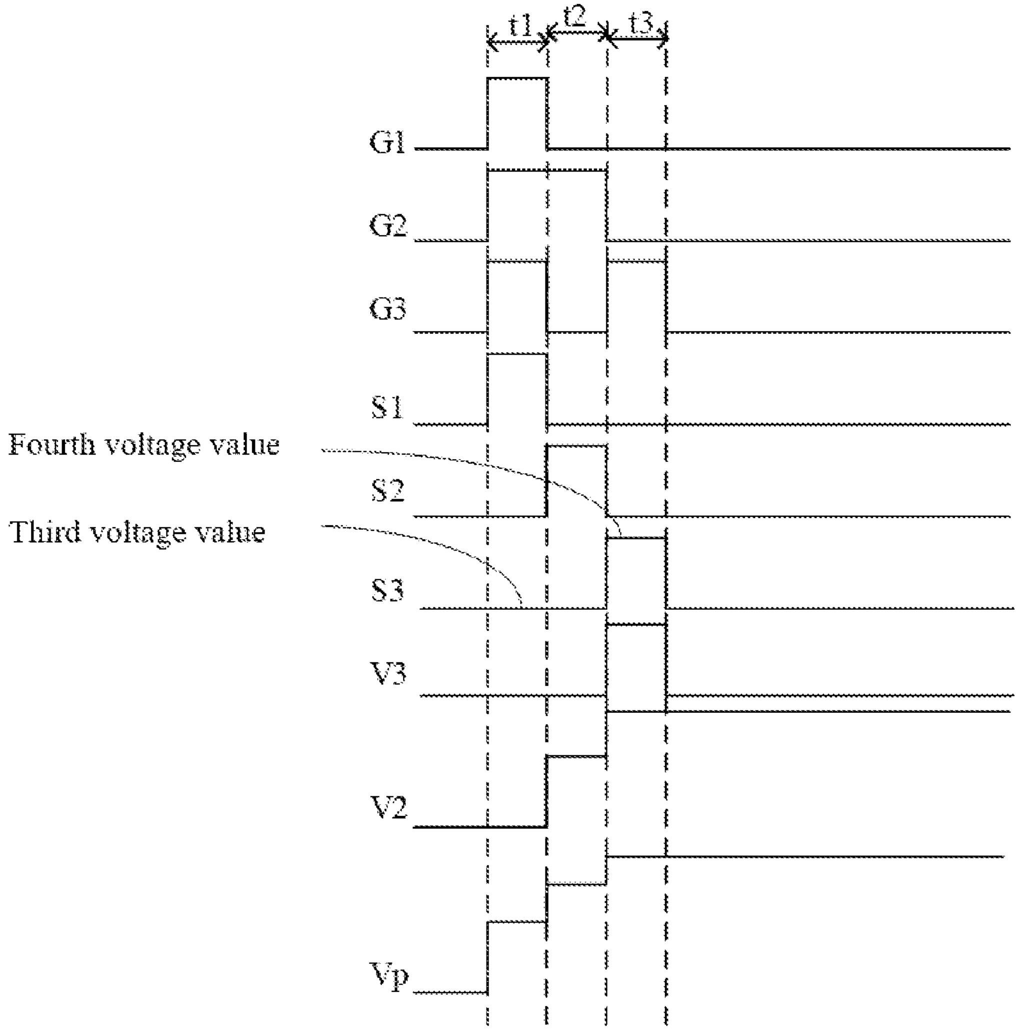
FIG. 5 is another drive timing diagram of a microfluidic pixel driving circuit according to an embodiment of the present disclosure.

FIG. 5 is another drive timing diagram of a microfluidic pixel driving circuit according to an embodiment of the present disclosure. Referring to FIGS. 1 and 5, in the first period t1, the enable level of the third scan signal G3 is used to control the third write unit 13 to be turned on to write the third voltage value of the third data signal S3 to the second terminal of the third capacitor C3, that is, to write the third voltage value of the third data signal S3 to the third node V3. In the second period t2, the disable level of the third scan signal G3 is used to control the third write unit 13 to be turned off.

In some embodiments, referring to FIGS. 1 and 2, a capacitor C in an m-th boost module 111 of the n boost modules 111 is connected in series between a write unit 10 in the m-th boost module 111 and a write unit 10 in an (m−1)-th boost module 111, where 2≤m≤n. A voltage $V_{p,tn}$ of the pixel electrode after n-stage boosting satisfies that $$V_{p,tn} = V_{SH} + \sum_{1}^{n} \frac{\frac{1}{C_1}}{\sum_{1}^{i} \frac{1}{C_j}} (V_{SH} - V_{SL}),$$

where $V_{SH}$ denotes a high-level data signal and $V_{SL}$ denotes a low-level data signal.

For example, referring to FIGS. 1 and 2, in the first period t1, it is satisfied that $$\begin{cases} V_{p,t1} = V_{SH} \\ V_{2,t1} = V_{SL} \\ V_{3,t1} = V_{SL} \end{cases},$$

where $V_{p,t1}$ denotes the voltage value of the first node Vp in the first period t1, $V_{2,t1}$ denotes the voltage value of the second node V2 in the first period t1, and $V_{3,t1}$ denotes the voltage value of the third node V3 in the first period t1.

In the second period t2, due to the charge conservation of the first node Vp, it is satisfied that $$\begin{cases} C_1 V_{p,t1} + C_2(V_{p,t1} - V_{2,t1}) = C_1 V_{p,t2} + C_2(V_{p,t2} - V_{2,t2}) \\ V_{2,t2} = V_{SH} \\ V_{3,t2} = V_{SL} \end{cases},$$

where $V_{p,t2}$ denotes the voltage value of the first node Vp in the second period t2, $V_{2,t2}$ denotes the voltage value of the second node V2 in the second period t2, $V_{3,t2}$ denotes the voltage value of the third node V3 in the second period t2, $C_1$ denotes a capacitance value of the first capacitor C1, and $C_2$ denotes a capacitance value of the second capacitor C2.

Based on above, the following is obtained:

$$V_{p,t2} = V_{SH} + \frac{C_2}{C_1 + C_2}(V_{SH} - V_{SL}).$$

In the third period t3, due to the charge conservation of the first node Vp, it is satisfied that $$\begin{cases} C_1 V_{p,t2} + C_2(V_{p,t2} - V_{2,t2}) = C_1 V_{p,t3} + C_2(V_{p,t3} - V_{2,t3}) \\ C_3(V_{2,t2} - V_{3,t2}) + C_2(V_{2,t2} - V_{p,t2}) = C_3(V_{2,t3} - V_{3,t3}) + C_2(V_{2,t3} - V_{p,t3}) \\ V_{3,t2} = V_{SH} \end{cases},$$

where $V_{p,t3}$ denotes the voltage value of the first node Vp in the third period t3, $V_{2,t3}$ denotes the voltage value of the second node V2 in the third period t3, $V_{3,t3}$ denotes the voltage value of the third node V3 in the third period t3, and $C_3$ denotes a capacitance value of the third capacitor C3.

It is obtained from the above:

$$V_{p,t3} = V_{SH} + \left(\frac{C_2}{C_1 + C_2} + \frac{C_2 C_3}{C_1 C_2 + C_2 C_3 + C_1 C_3}\right)(V_{SH} - V_{SL}).$$

Based on the preceding processes of calculating $V_{p,t2}$ and $V_{p,t3}$, similarly, the same is done for the n-th boost module 111 to obtain that $$V_{p,tn} = V_{SH} + \sum_{1}^{n} \frac{\frac{1}{C_1}}{\sum_{1}^{i} \frac{1}{C_j}} (V_{SH} - V_{SL}).$$

In some embodiments, referring to FIGS. 1 and 2, a second terminal of the capacitor C in the m-th boost module 111 is electrically connected to the write unit 10 in the m-th boost module 111, and a first terminal of the capacitor C in the m-th boost module 111 is electrically connected to the write unit 10 in the (m−1)-th boost module 111, where 2≤m≤n. From the second boost module 111 to the n-th boost module 111, a capacitor C in the m-th boost module 111 is connected in series between a write unit 10 in the m-th boost module 111 and a write unit 10 in the (m−1)-th boost module 111. A capacitor C in the higher-stage boost module 111 has a greater capacitance value. The capacitance value of the second capacitor C2 is greater than the capacitance value of the first capacitor C1, the capacitance value of the third capacitor C3 is greater than the capacitance value of the second capacitor C2, . . . , a capacitance value of the capacitor C in the m-th boost module 111 is greater than a capacitance value of a capacitor C in the (m−1)-th boost module 111, . . . , and a capacitance value of a capacitor C in the n-th boost module 111 is greater than a capacitance value of a capacitor C in an (n−1)-th boost module 111. The capacitor C in the m-th boost module 111 has a greater distance from the first node Vp than the capacitor C in the (m−1)-th boost module 111. Thus, the greater capacitance value needs to be set, to increase a voltage increment fed to the first node Vp, increase a voltage increment of the first node Vp, and increase the voltage of the pixel electrode.

In some embodiments, referring to FIGS. 1 and 2, the second terminal of the capacitor C in the m-th boost module 111 is electrically connected to the write unit 10 in the m-th boost module 111, and the first terminal of the capacitor C in the m-th boost module 111 is electrically connected to the write unit 10 in the (m−1)-th boost module 111, where 2≤m≤n. The write unit 10 includes a transistor, and the transistor includes the first transistor M1, the second transistor M2, and the third transistor M3. A transistor in the higher-stage boost module 111 has a greater channel width-to-length ratio. A channel width-to-length ratio of the second transistor M2 is greater than a channel width-to-length ratio of the first transistor M1, a channel width-to-length ratio of the third transistor M3 is greater than the channel width-to-length ratio of the second transistor M2, . . . , a channel width-to-length ratio of the transistor in the m-th boost module 111 is greater than a channel width-to-length ratio of a transistor in the (m−1)-th boost module 111, . . . , and a channel width-to-length ratio of a transistor in the n-th boost module 111 is greater than a channel width-to-length ratio of a transistor in the (n−1)-th-stage boost module 111. The greater capacitance value the capacitor C in the higher-stage boost module 111 has, the more charges the capacitor C in the higher-stage boost module 111 is charged or discharged. Thus, the transistor in the higher-stage boost module 111 is configured with the greater channel width-to-length ratio to adapt to the capacitance value and charging time of the capacitor C so that capacitors C with different capacitance values can complete a charging or discharging process in the same or similar time.

For example, referring to FIGS. 2 and 3, the transistor is an n-type transistor, which is turned on at a high level and turned off at a low level. For the n-type transistor, the high level is an enable level and the low level is a disable level.

In other embodiments, the transistor may be a p-type transistor, which is turned on at the low level and turned off at the high level. For the p-type transistor, the low level is an enable level and the high level is a disable level.

Figure 6:
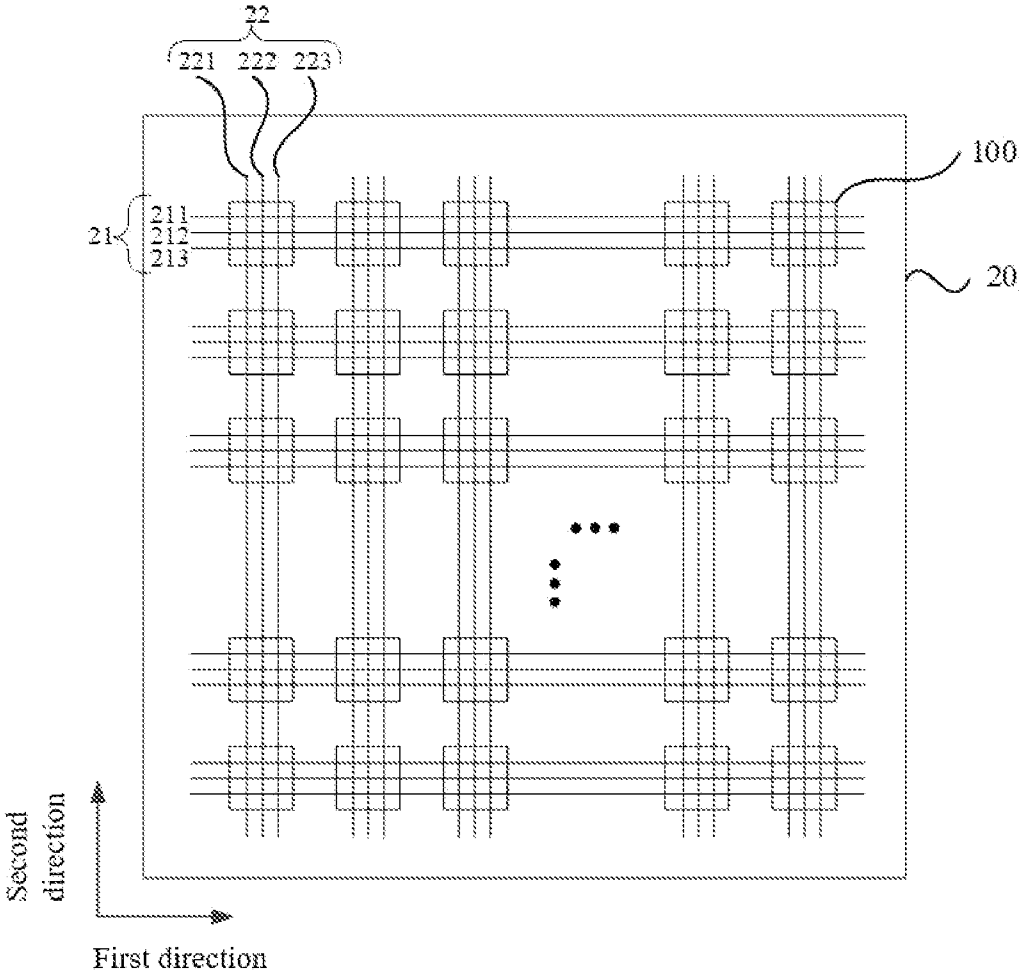
FIG. 6 is a top view illustrating the structure of a microfluidic substrate according to an embodiment of the present disclosure.
Figure 7:
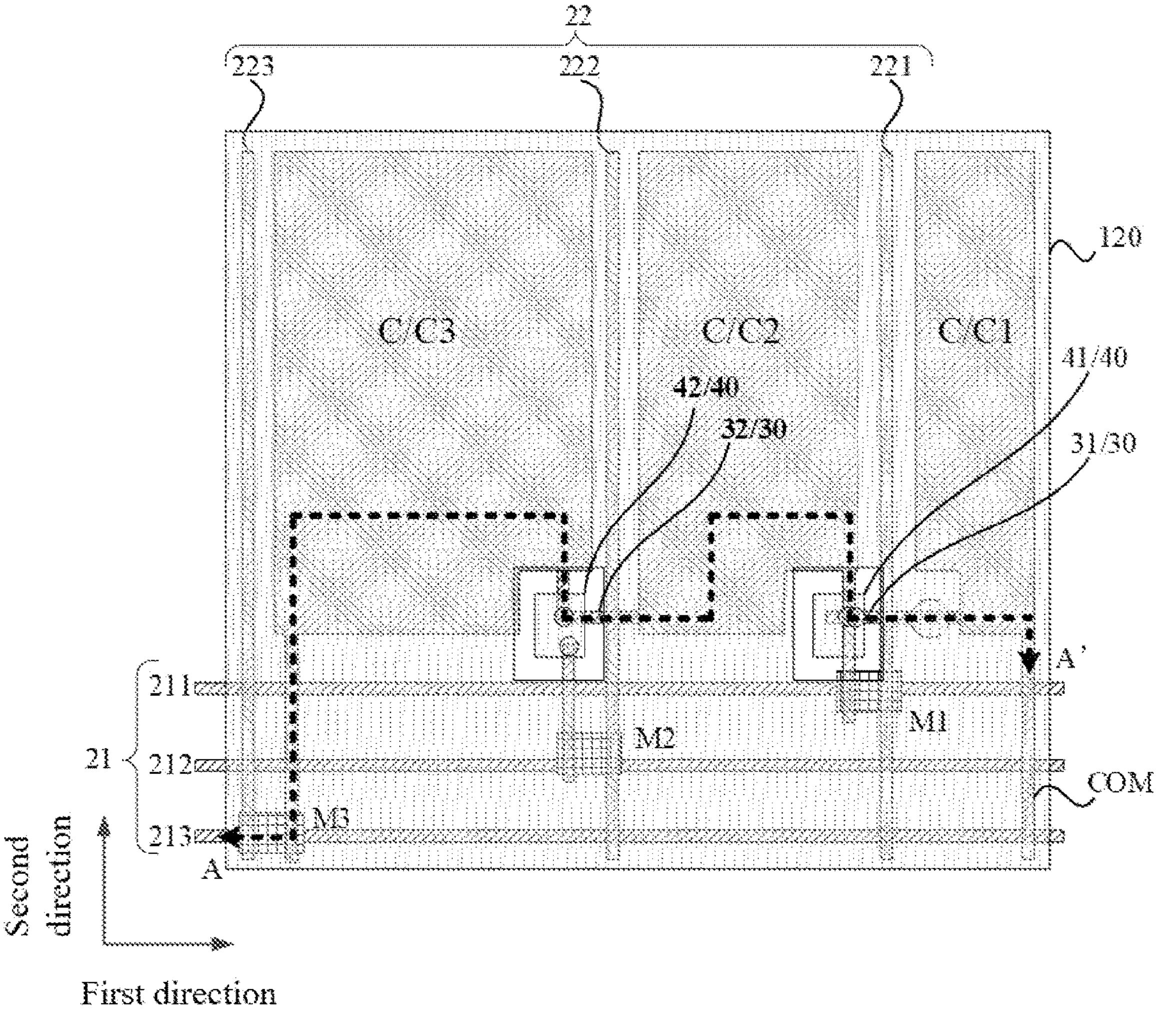
FIG. 7 is a top view illustrating the structure of a pixel unit according to an embodiment of the present disclosure.
Figure 8:
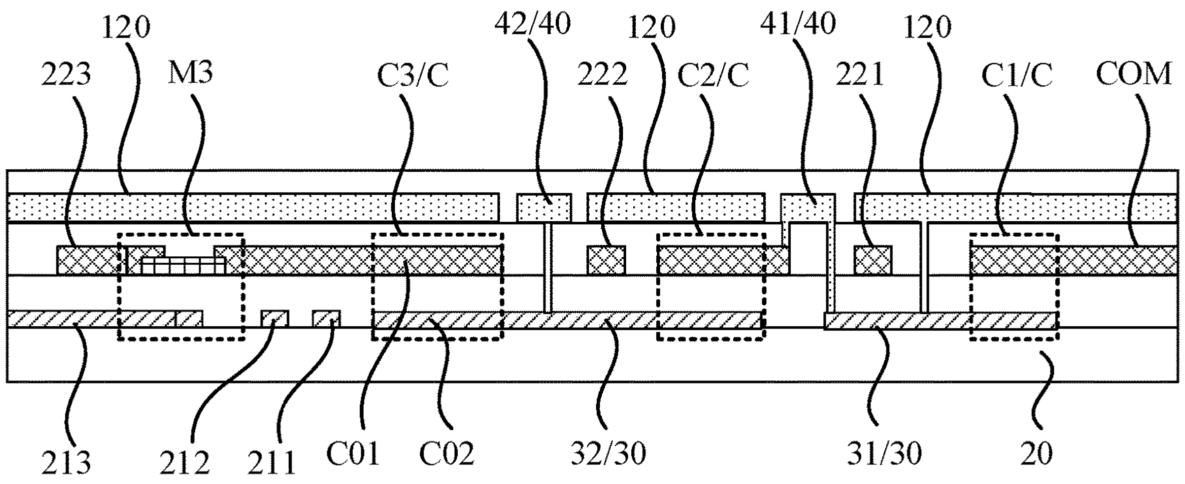
FIG. 8 is a sectional view of the pixel unit of FIG. 7 taken along a direction AA'.

FIG. 6 is a top view illustrating the structure of a microfluidic substrate according to an embodiment of the present disclosure. FIG. 7 is a top view illustrating the structure of a pixel unit according to an embodiment of the present disclosure. FIG. 8 is a sectional view of the pixel unit of FIG. 7 taken along a direction AA'. Referring to FIGS. 6 to 8, the microfluidic substrate includes a substrate 20 and a pixel unit 100 on a side of the substrate 20. The pixel unit 100 includes the microfluidic pixel driving circuit 110 in the preceding embodiments and a pixel electrode 120. The microfluidic pixel driving circuit 110 is electrically connected to the pixel electrode 120 and provides a drive voltage for the pixel electrode 120. Since the microfluidic pixel driving circuit 110 can implement multi-stage boosting, a voltage value of the pixel electrode 120 is increased.

In some embodiments, referring to FIGS. 6 to 8, the microfluidic substrate includes a scan line unit 21 and a data line unit 22. The data line unit 22 includes n data lines arranged along a first direction. The scan line unit 21 includes n scan lines arranged along a second direction. The first direction intersects the second direction. Each capacitor C of the n boost modules includes an upper plate C01 and a lower plate C02. In a direction perpendicular to the substrate 20, the lower plate C02 is disposed between the substrate 20 and the upper plate C01, and the upper plate C01 is disposed between the pixel electrode 120 and the lower plate C02. The upper plate C01 is in the same layer as the data lines, and the lower plate C02 is in the same layer as the scan lines. Thus, the upper plate C01 of the capacitor C and the data lines can both be formed by using the same material in the same process, and the lower plate C02 of the capacitor C and the scan lines both can be formed by using the same material in the same process, thereby saving manufacturing processes.

For example, referring to FIGS. 6 to 8, the case where n=3 is taken as an example. The data line unit 22 includes three data lines arranged along the first direction. The scan line unit 21 includes three scan lines arranged along the second direction. The three scan lines in the scan line unit 21 are denoted as a first scan line 211, a second scan line 212, and a third scan line 213, separately. The three data lines in the data line unit 22 are denoted as a first data line 221, a second data line 222, and a third data line 223, separately. Multiple scan lines in multiple scan line units 21 may extend along the first direction and be arranged along the second direction, and multiple data lines in multiple data line units 22 may extend along the second direction and be arranged along the first direction.

In some embodiments, referring to FIGS. 6 to 8, the microfluidic substrate includes a fixed potential line COM (not shown in FIG. 6). An upper plate C01 of the first capacitor C1 is electrically connected to the fixed potential line COM. A lower plate C02 of the first capacitor C1 is electrically connected to the pixel electrode 120, and the lower plate C02 of the first capacitor C1 has the same voltage as the pixel electrode 120. The upper plate C01 of the first capacitor C1 is disposed between the lower plate C02 of the first capacitor C1 and the pixel electrode 120, the upper plate C01 of the first capacitor C1 and the lower plate C02 of the first capacitor C1 form a capacitor, and the upper plate C01 of the first capacitor C1 and the pixel electrode 120 form a capacitor, thereby increasing a capacitance value of the first capacitor C1. On the premise that the capacitance value of the first capacitor C1 is set, an area of the first capacitor C1 can be reduced so that enough space is reserved for other elements such as a second capacitor C2, or an area of the pixel unit 100 can be reduced so that the number of pixel units 100 in a unit area can be increased, thereby increasing a pixel resolution.

In some embodiments, referring to FIGS. 2, 7, and 8, the upper plate C01 of the first capacitor C1 is in the same layer as the fixed potential line COM. Thus, the upper plate C01 of the first capacitor C1 and the fixed potential line COM can both be formed by using the same material in the same process, thereby saving the manufacturing processes.

In some embodiments, referring to FIGS. 2, 7, and 8, an upper plate C01 of the second capacitor C2 is electrically connected to the lower plate C02 of the first capacitor C1. Since the lower plate C02 of the first capacitor C1 is electrically connected to the pixel electrode 120, the upper plate C01 of the second capacitor C2 is electrically connected to the pixel electrode 120. In other embodiments, a lower plate C02 of the second capacitor C2 may be electrically connected to the lower plate C02 of the first capacitor C1.

In some embodiments, referring to FIGS. 2, 7, and 8, a lower plate C02 of the third capacitor C3 is electrically connected to the lower plate C02 of the second capacitor C2. The lower plate C02 of the third capacitor C3 is in the same layer as the lower plate C02 of the second capacitor C2, the lower plate C02 of the third capacitor C3 and the lower plate C02 of the second capacitor C2 may be formed in the same process, and when the lower plate C02 of the third capacitor C3 and the lower plate C02 of the second capacitor C2 are patterned, a conductive film between the lower plate C02 of the third capacitor C3 and the lower plate C02 of the second capacitor C2 may be retained as a connection line, thereby simplifying a manufacturing process.

For example, referring to FIGS. 2, 7, and 8, a transistor includes a semiconductor layer, a gate, a first electrode, and a second electrode. The gate of the transistor is in the same layer as the lower plate C02 of the capacitor C, and the first electrode of the transistor and the second electrode of the transistor are in the same layer as the upper plate C01 of the capacitor C. When the lower plate C02 of the third capacitor C3 is electrically connected to the lower plate C02 of the second capacitor C2, an upper plate C01 of the third capacitor C3 is electrically connected to a first electrode of a third transistor M3. The upper plate C01 of the third capacitor C3 is in the same layer as the first electrode of the third transistor M3, the upper plate C01 of the third capacitor C3 and the first electrode of the third transistor M3 may be formed in the same process, and when the upper plate C01 of the third capacitor C3 and the first electrode of the third transistor M3 are patterned, a conductive film between the upper plate C01 of the third capacitor C3 and the first electrode of the third transistor M3 may be retained as a connection line, thereby simplifying a manufacturing process.

In some embodiments, referring to FIGS. 2, 7, and 8, the data lines include the first data line 221 providing a first data signal S1. Along the first direction, a vertical projection of the first data line 221 on the substrate 20 is located between a vertical projection of the first capacitor C1 on the substrate 20 and a vertical projection of the second capacitor C2 on the substrate 20. The microfluidic substrate further includes a connection line 30 and a bridge 40, where the connection line 30 overlaps the first data line 221 in different layers, and a first terminal of the connection line 30 is electrically connected to the lower plate C02 of the first capacitor C1. The bridge 40 is used to is used to connect a second terminal of the connection line 30 to the upper plate C01 of the second capacitor C2. Thus, the upper plate C01 of the second capacitor C2 is electrically connected to the lower plate C02 of the first capacitor C1 through the bridge 40 and the connection line 30.

For example, referring to FIGS. 2, 7, and 8, the connection line 30 includes a first connection line 31, where the first connection line 31 and the upper plate C01 of the second capacitor C2 are in different layers, and the first connection line 31 overlaps the first data line 221 in different layers. The bridge 40 includes a first bridge 41 connecting the first connection line 31 to the upper plate C01 of the second capacitor C2.

In some embodiments, referring to FIGS. 2, 7, and 8, the data lines include the second data line 222 providing a second data signal S2. Along the first direction, a vertical projection of the second data line 222 on the substrate 20 is located between the vertical projection of the second capacitor C2 on the substrate 20 and a vertical projection of the third capacitor C3 on the substrate 20. The microfluidic substrate further includes a connection line 30, where the connection line 20 overlaps the second data line 222 in different layers, and the connection line 30 is used to connect the lower plate C02 of the second capacitor C2 to the lower plate C02 of the third capacitor C3. Thus, the lower plate C02 of the third capacitor C3 is electrically connected to the lower plate C02 of the second capacitor C2 through the connection line 30.

For example, referring to FIGS. 2, 7, and 8, the connection line 30 includes a second connection line 32, where the second connection line 32 overlaps the second data line 222 in different layers.

Figure 9:
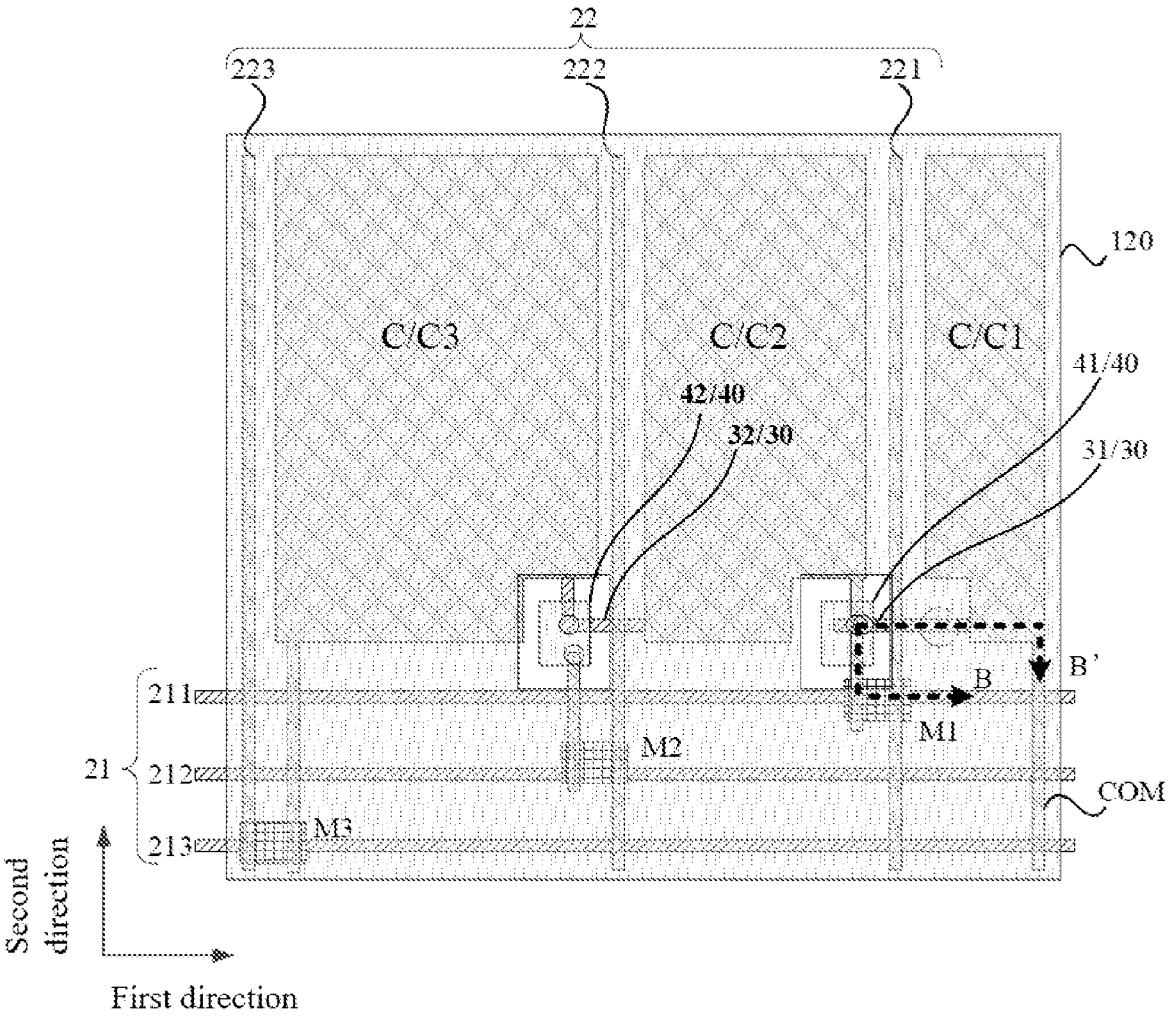
FIG. 9 is another top view illustrating the structure of a pixel unit according to an embodiment of the present disclosure.
Figure 10:
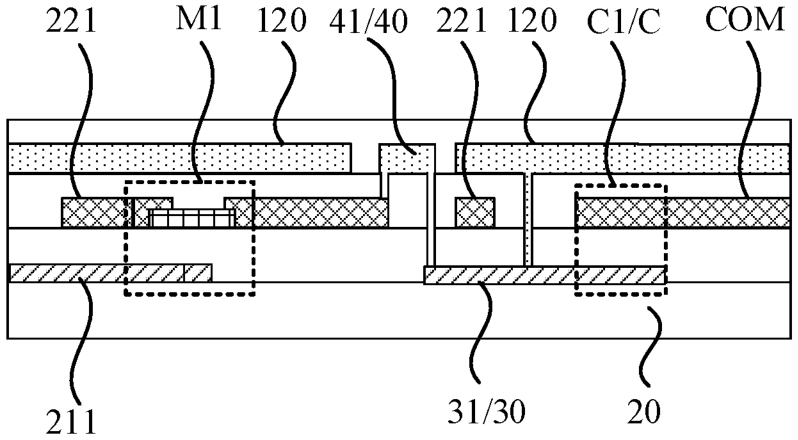
FIG. 10 is a sectional view of the pixel unit of FIG. 9 taken along a direction BB'.

FIG. 9 is another top view illustrating the structure of a pixel unit according to an embodiment of the present disclosure. FIG. 10 is a sectional view of the pixel unit of FIG. 9 taken along a direction BB'. Referring to FIGS. 2, 9, and 10, the scan lines include the first scan line 211 providing a first scan signal G1. A first write unit 11 includes a first transistor M1, where a gate of the first transistor M1 is electrically connected to the first scan line 211, and the first scan line 211 provides the first scan signal G1 for the gate of the first transistor M1. A first electrode of the first transistor M1 is electrically connected to the bridge 40. Specifically, the first electrode of the first transistor M1 is electrically connected to the first bridge 41 and connected to the pixel electrode 120 through the first bridge 41 and the first connection line 31. A second electrode of the first transistor M1 is electrically connected to the first data line 221 in the same layer.

Figure 11:
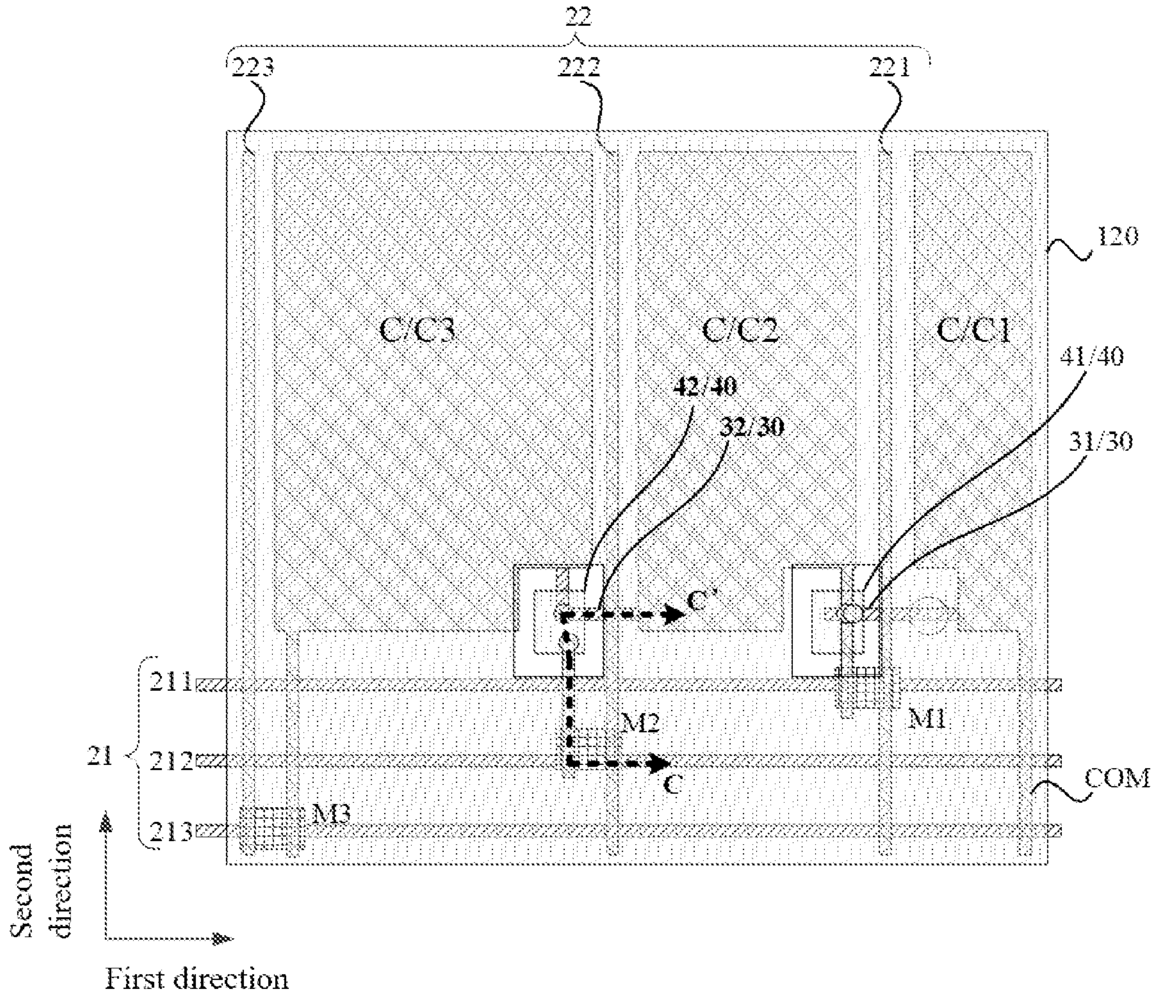
FIG. 11 is another top view illustrating the structure of a pixel unit according to an embodiment of the present disclosure.
Figure 12:
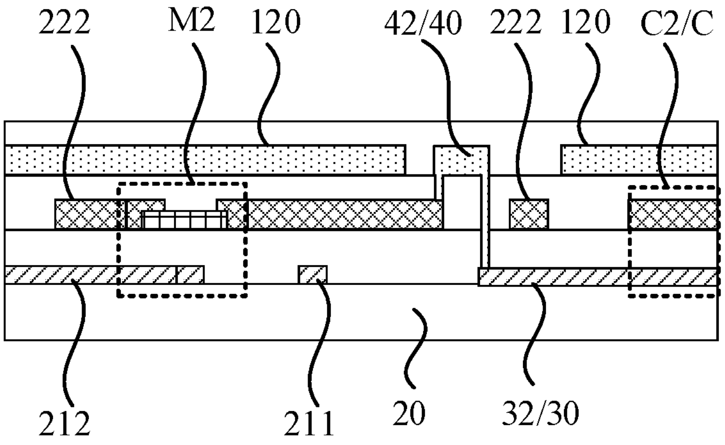
FIG. 12 is a sectional view of the pixel unit of FIG. 11 taken along a direction CC'.

FIG. 11 is another top view illustrating the structure of a pixel unit according to an embodiment of the present disclosure. FIG. 12 is a sectional view of the pixel unit of FIG. 11 taken along a direction CC'. Referring to FIGS. 2, 11, and 12, the scan lines include the second scan line 212 providing a second scan signal G2. A second write unit 12 includes a second transistor M2, where a gate of the second transistor M2 is electrically connected to the second scan line 212, and the second scan line 212 provides the second scan signal G2 for the gate of the second transistor M2. A second electrode of the second transistor M2 is electrically connected to the second data line 222 in the same layer. The microfluidic substrate further includes a bridge 40, where the bridge 40 is used to connect the connection line 30 to a first electrode of the second transistor M2.

For example, referring to FIGS. 2, 11, and 12, the connection line 30 includes the second connection line 32, where the second connection line 32 and the first electrode of the second transistor M2 are in different layers, and the second connection line 32 overlaps the second data line 222 in different layers. The bridge 40 includes a second bridge 42 connecting the second connection line 32 to the first electrode of the second transistor M2.

In some embodiments, referring to FIGS. 2, 7, and 8, the data lines further include the third data line 223 providing a third data signal S3. Along the first direction, a vertical projection of the third data line 223 on the substrate 20 is located on a side of the vertical projection of the third capacitor C3 on the substrate 20 facing away from the vertical projection of the second capacitor C2 on the substrate 20. Along the first direction, the vertical projection of the third capacitor C3 on the substrate 20 is located between the vertical projection of the third data line 223 on the substrate 20 and the vertical projection of the second data line 222 on the substrate 20. The scan lines include the third scan line 213 providing a third scan signal G3. A third write unit 13 includes the third transistor M2, where a gate of the third transistor M3 is electrically connected to the third scan line 213, and the third scan line 213 provides the third scan signal G3 for the gate of the third transistor M3. The first electrode of the third transistor M3 is electrically connected to the upper plate C01 of the third capacitor C3 in the same layer. A second electrode of the third transistor M3 is electrically connected to the third data line 223 in the same layer.

In some embodiments, referring to FIGS. 7 and 8, the bridge 40 is in the same layer as the pixel electrode 120. Thus, the bridge 40 and the pixel electrode 120 can both be formed by using the same material in the same process, thereby saving the manufacturing processes. On the other hand, no new film needs to be provided for the bridge 40, thereby reducing a thickness of the microfluidic substrate. Additionally, the bridge 40 and the pixel electrode 120 are in the same layer, a shallow hole needs to be formed between the bridge 40 and the upper plate C01 of the capacitor C, a deep hole needs to be formed between the bridge 40 and the lower plate C02 of the capacitor C, and the deep hole and the shallow hole can be formed in the same photolithography process, thereby saving the manufacturing processes.

For example, referring to FIGS. 7 and 8, the pixel electrode 120 is provided with an opening at the position of the bridge 40, to prevent the pixel electrode 120 from being directly connected to the bridge 40. For the first bridge 41, since the first bridge 41 is electrically connected to the pixel electrode 120 through the first connection line 31, the first bridge 41 is electrically connected to the pixel electrode 120 indirectly even if the first bridge 41 is not directly connected to the pixel electrode 120. For the second bridge 42, since the second bridge 42 is electrically connected to the lower plate C02 of the second capacitor C2 through the second connection line 32, the second bridge 42 is electrically insulated from the pixel electrode 120.

Figure 13:
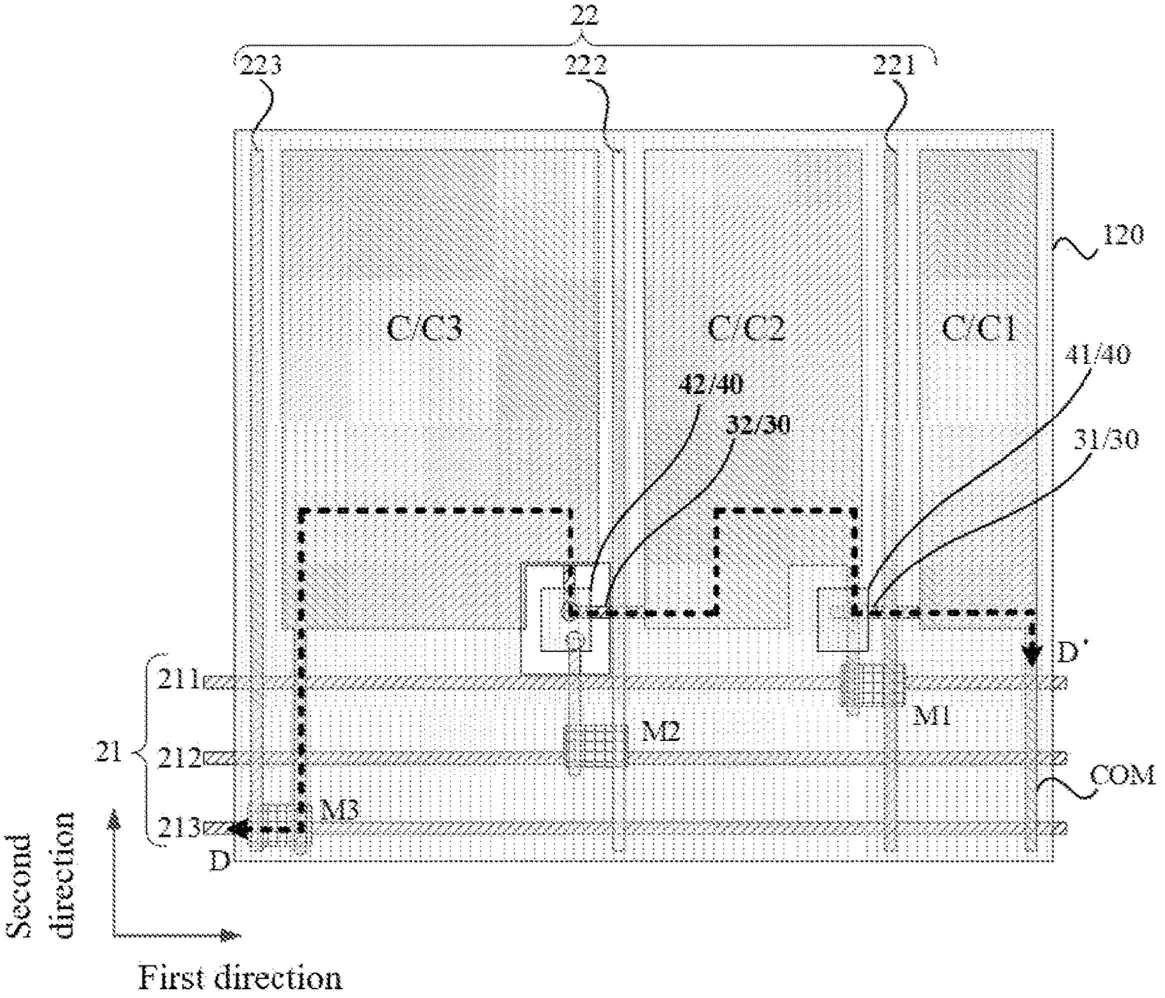
FIG. 13 is another top view illustrating the structure of a pixel unit according to an embodiment of the present disclosure.
Figure 14:
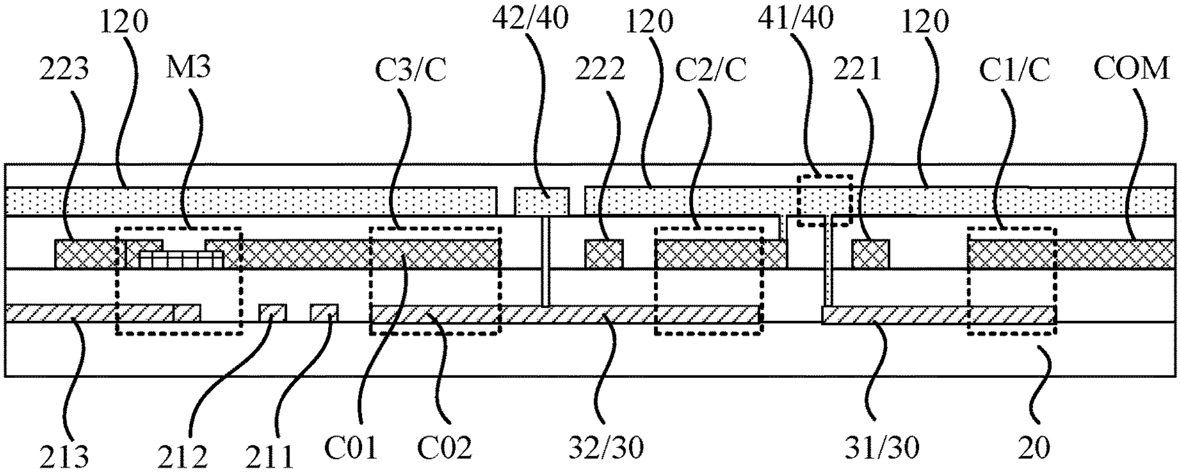
FIG. 14 is a sectional view of the pixel unit of FIG. 13 taken along a direction DD'.

FIG. 13 is another top view illustrating the structure of a pixel unit according to an embodiment of the present disclosure. FIG. 14 is a sectional view of the pixel unit of FIG.

13 taken along a direction DD'. Referring to FIGS. 13 and 14, the pixel electrode 120 is provided with no opening at the position of the first bridge 41, and the first bridge 41 and the pixel electrode 120 are an integrated structure. The first bridge 41 may be understood as a position of a conductive film where the pixel electrode 120 is located for setting a via for the first connection line 31. The pixel electrode 120 is directly connected to the first bridge 41. For the second bridge 42, since the second bridge 42 is electrically connected to the lower plate C02 of the second capacitor C2 through the second connection line 32, the pixel electrode 120 needs to be provided with an opening at the position of the second bridge 42, to ensure that the second bridge 42 is electrically insulated from the pixel electrode 120.

Figure 15:
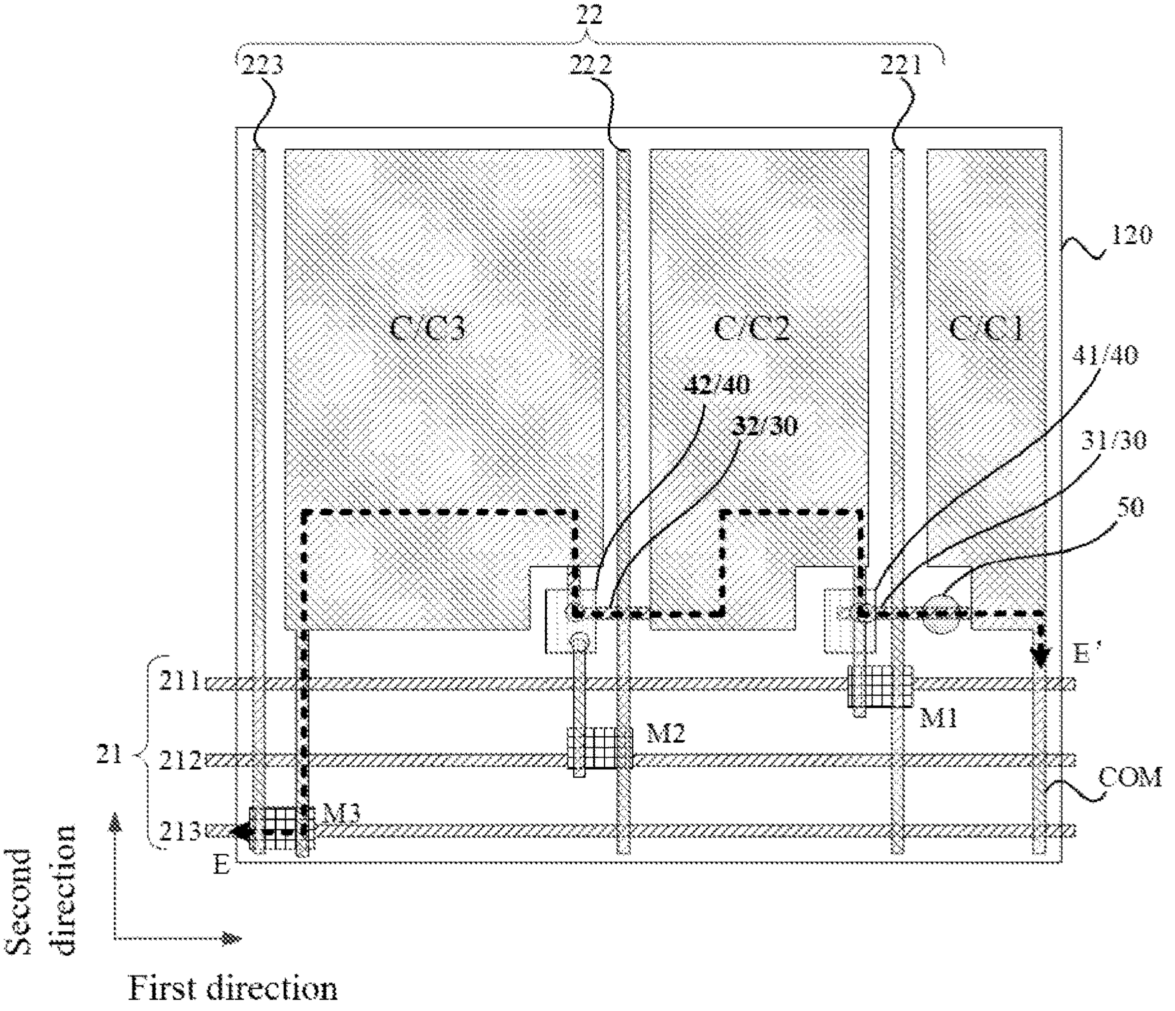
FIG. 15 is another top view illustrating the structure of a pixel unit according to an embodiment of the present disclosure.
Figure 16:
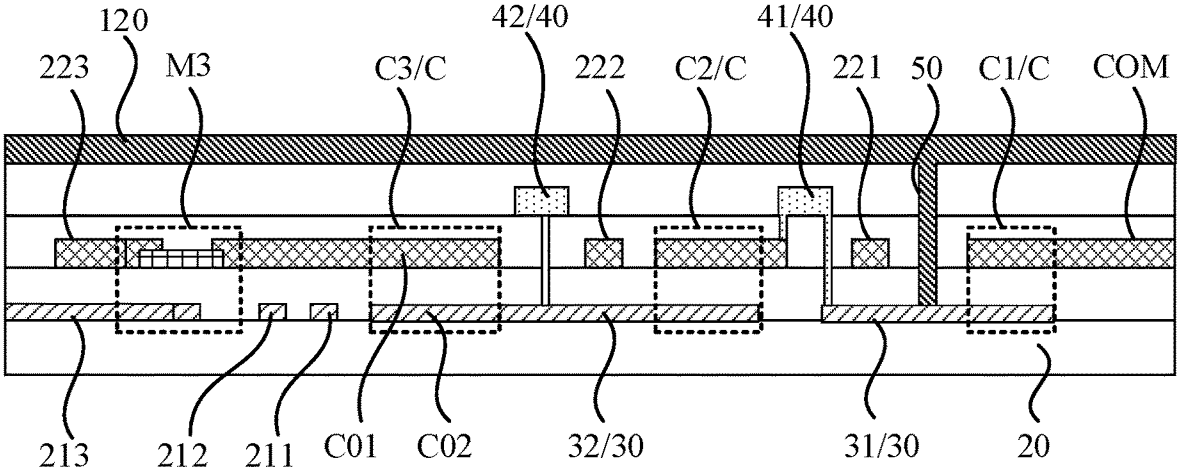
FIG. 16 is a sectional view of the pixel unit of FIG. 15 taken along a direction EE'.

FIG. 15 is another top view illustrating the structure of a pixel unit according to an embodiment of the present disclosure. For the sake of clarity, the filling pattern of the pixel electrode 120 in FIG. 15 is omitted and the outline of the pixel electrode 120 is illustrated only by an outer box, to prevent other films from being blocked by the pixel electrode 120 filled with the pattern. FIG. 16 is a sectional view of the pixel unit of FIG. 15 taken along a direction EE'. Referring to FIGS. 15 and 16, the bridge 40 and the pixel electrode 120 are in different layers. For example, in the direction perpendicular to the substrate 20, the bridge 40 is disposed between the upper plate C01 of the capacitor C and the pixel electrode 120. Since the bridge 40 and the pixel electrode 120 are in different layers, the bridge 40 may overlap the pixel electrode 120 in the direction perpendicular to the substrate 20.

For example, referring to FIGS. 15 and 16, the pixel electrode 120 is connected to the first connection line 31 through a via 50.

Figure 17:
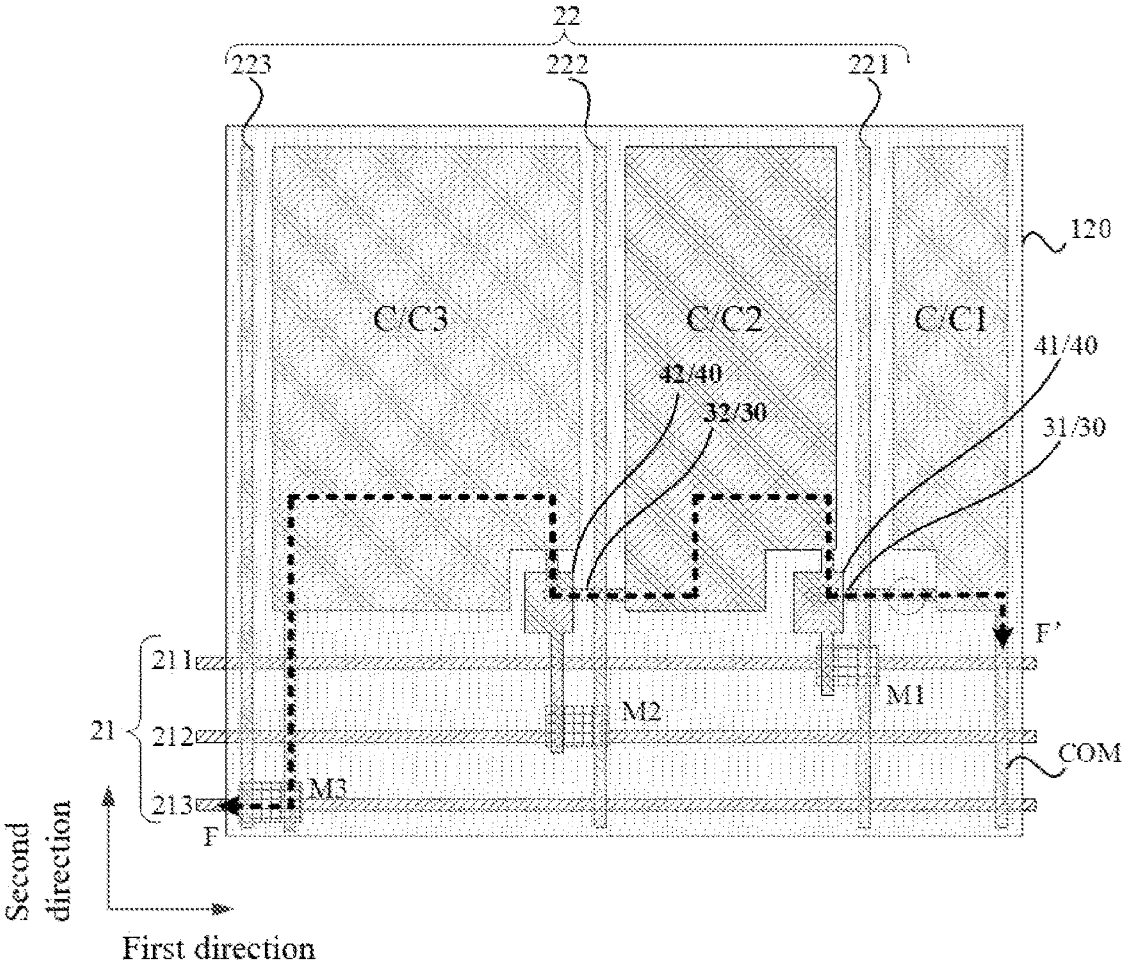
FIG. 17 is another top view illustrating the structure of a pixel unit according to an embodiment of the present disclosure.
Figure 18:
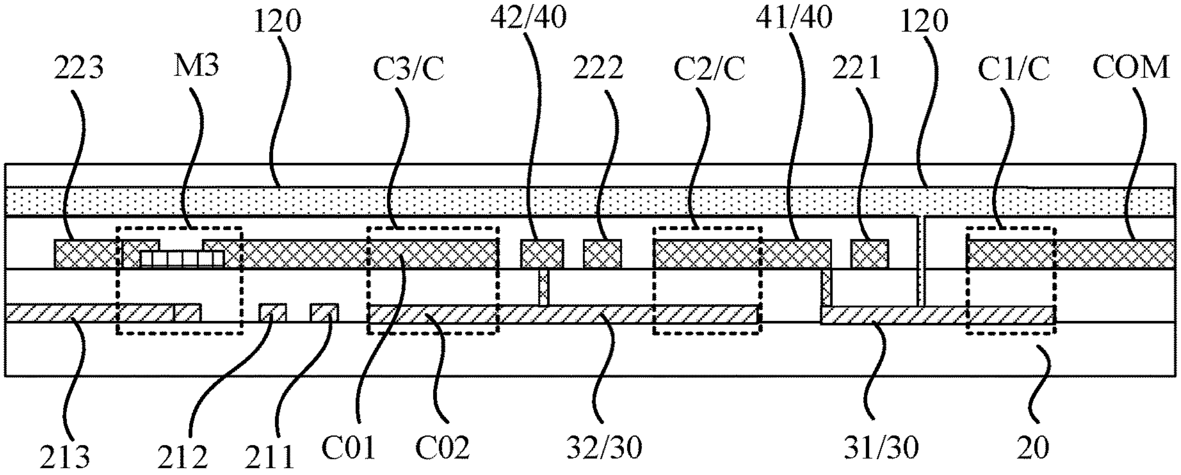
FIG. 18 is a sectional view of the pixel unit of FIG. 17 taken along a direction FF'.

FIG. 17 is another top view illustrating the structure of a pixel unit according to an embodiment of the present disclosure. FIG. 18 is a sectional view of the pixel unit of FIG. 17 taken along a direction FF'. Referring to FIGS. 17 and 18, the bridge 40 is in the same layer as the data lines. Thus, the bridge 40 and the data lines can both be formed by using the same material in the same process, thereby saving the manufacturing processes. On the other hand, no new film needs to be provided for the bridge 40, thereby reducing the thickness of the microfluidic substrate.

For example, referring to FIGS. 17 and 18, since the bridge 40 and the pixel electrode 120 are in different layers, the bridge 40 may overlap the pixel electrode 120 in the direction perpendicular to the substrate 20.

In some embodiments, referring to FIGS. 7 and 8, the connection line 30 is in the same layer as the scan lines. Thus, the connection line 30 and the scan lines can both be formed by using the same material in the same process, thereby saving the manufacturing processes. On the other hand, no new film needs to be provided for the connection line 30, thereby reducing the thickness of the microfluidic substrate. Additionally, the connection line 30 is in the same layer as the scan lines, the scan lines are in the same layer as the lower plate C02 of the capacitor C, and the connection line 30 is in the same layer as the lower plate C02 of the capacitor C so that when the connection line 30 is connected to the lower plate C02 of the capacitor C, the connection line 30 is directly electrically connected to the lower plate C02 of the capacitor C in the same layer without providing a bridge, the space originally used for providing the capacitor C is not occupied, and an area of the capacitor C is increased. On the premise that the capacitance value of the capacitor C is set, the area of the pixel unit 100 can be reduced so that the number of pixel units 100 in a unit area can be increased, thereby increasing the pixel resolution.

Figure 19:
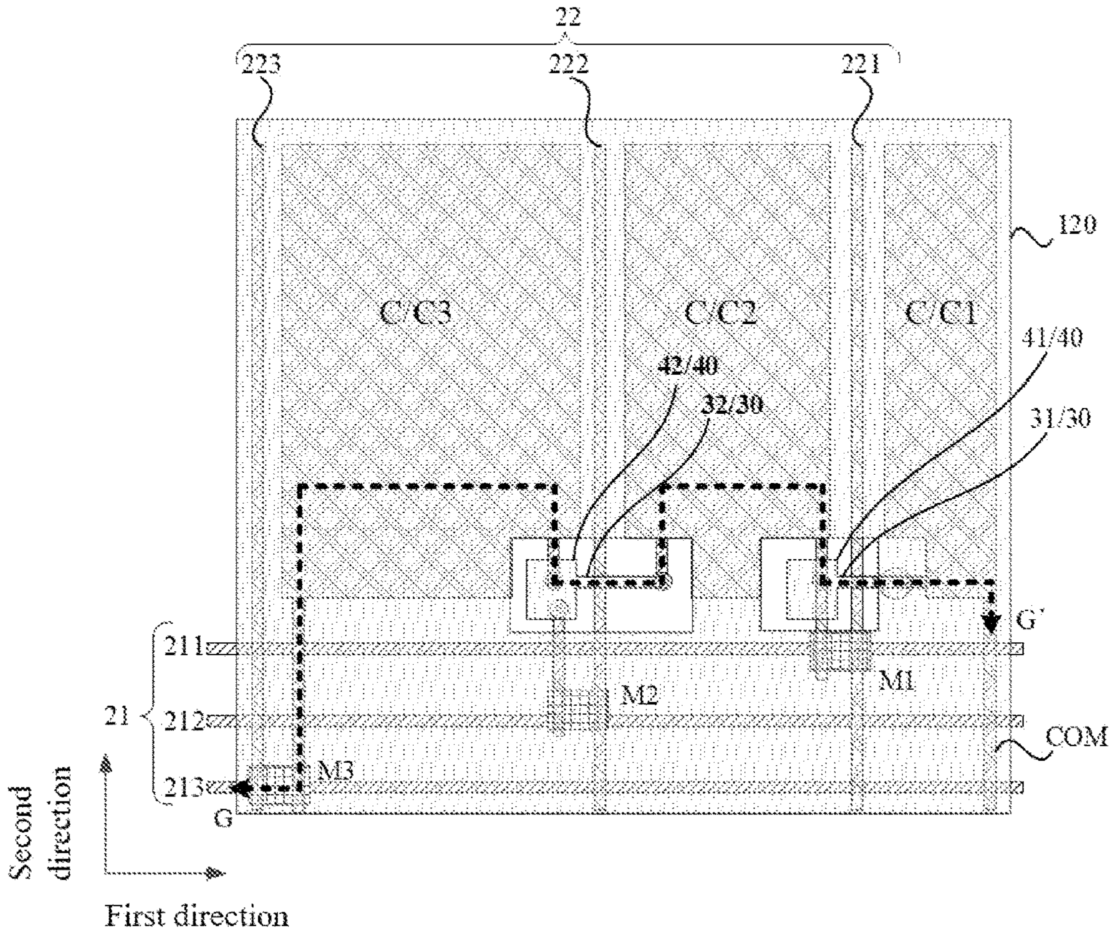
FIG. 19 is another top view illustrating the structure of a pixel unit according to an embodiment of the present disclosure.
Figure 20:
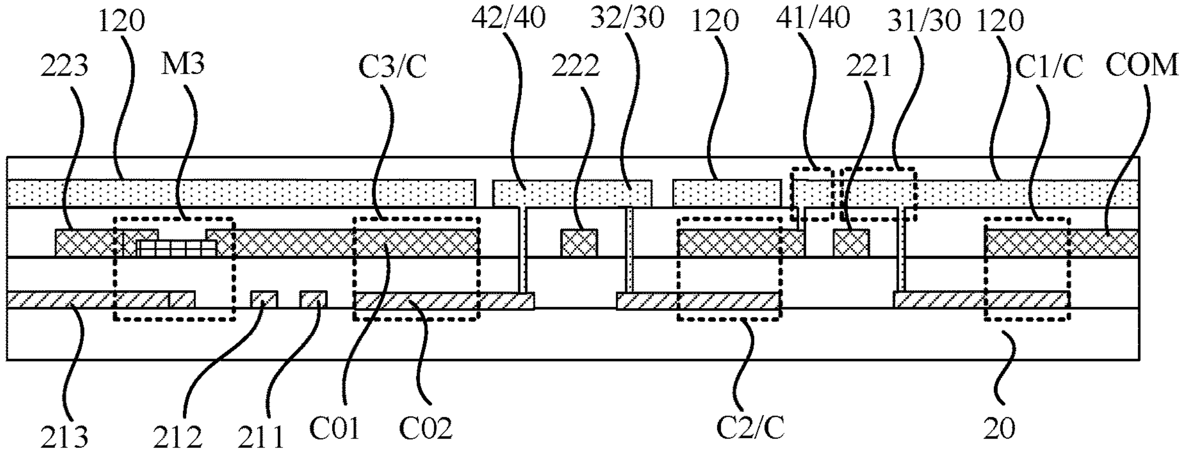
FIG. 20 is a sectional view of the pixel unit of FIG. 19 taken along a direction GG'.

FIG. 19 is another top view illustrating the structure of a pixel unit according to an embodiment of the present disclosure. FIG. 20 is a sectional view of the pixel unit of FIG. 19 taken along a direction GG'. Referring to FIGS. 19 and 20, the connection line 30 is in the same layer as the pixel electrode 120. Thus, the connection line 30 and the pixel electrode 120 can both be formed by using the same material in the same process, thereby saving the manufacturing processes.

For example, referring to FIGS. 19 and 20, the pixel electrode 120 is provided with an opening at the position of the connection line 30. For the first connection line 31, since the first connection line 31 is electrically connected to the pixel electrode 120, the first connection line 31 is electrically connected to the pixel electrode 120. For the second connection line 32, since the second connection line 32 is electrically connected to the lower plate C02 of the second capacitor C2, the second connection line 32 is electrically insulated from the pixel electrode 120.

For example, referring to FIGS. 7 and 8, the microfluidic substrate includes the fixed potential line COM, the fixed potential line COM extend along the second direction, and the fixed potential line COM is in the same layer as the data lines (including the first data line 221 and the second data line 222). Thus, the fixed potential line COM is electrically connected to the upper plate C01 of the first capacitor C1 in the same layer.

Figure 21:
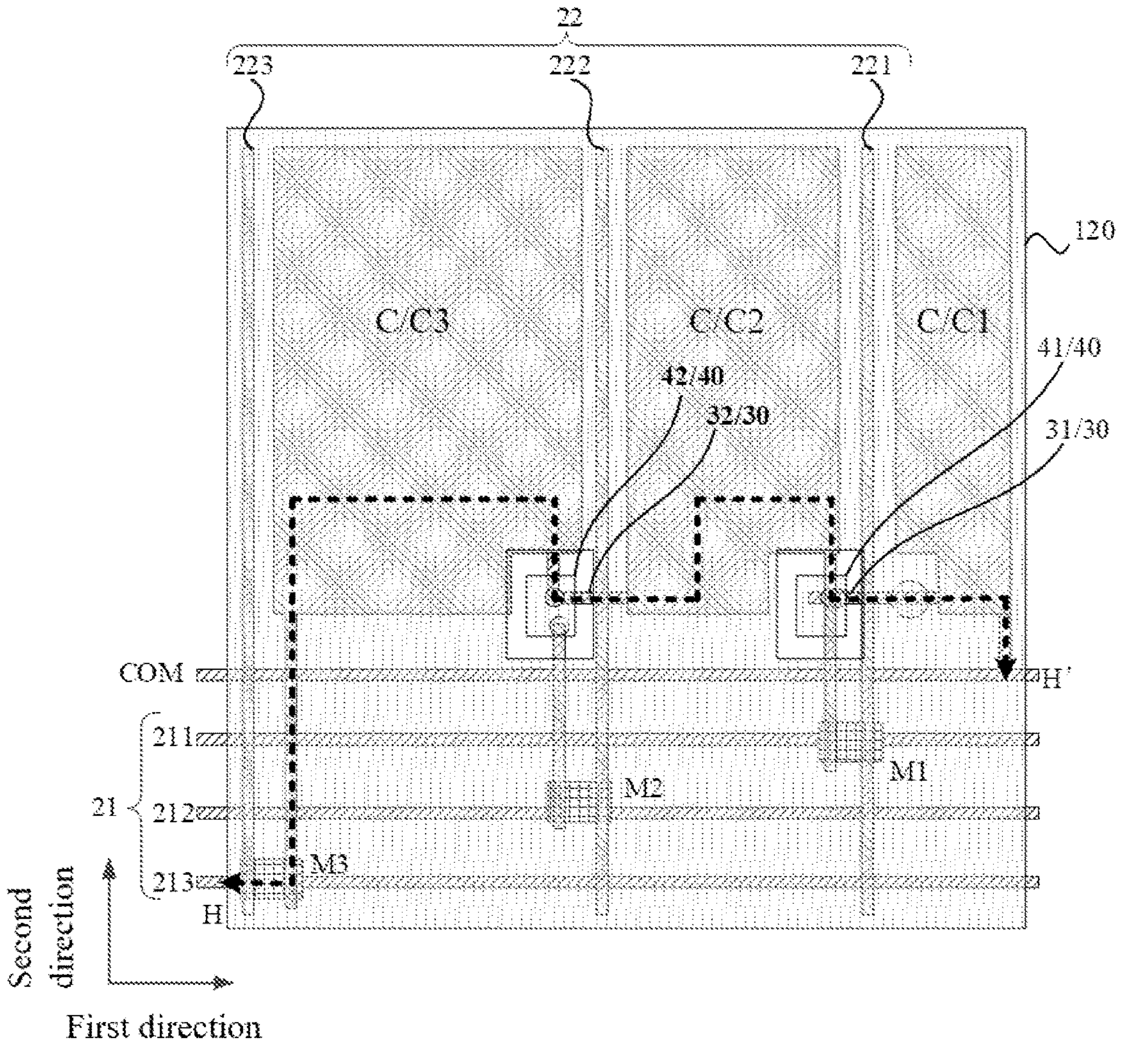
FIG. 21 is another top view illustrating the structure of a pixel unit according to an embodiment of the present disclosure.
Figure 22:
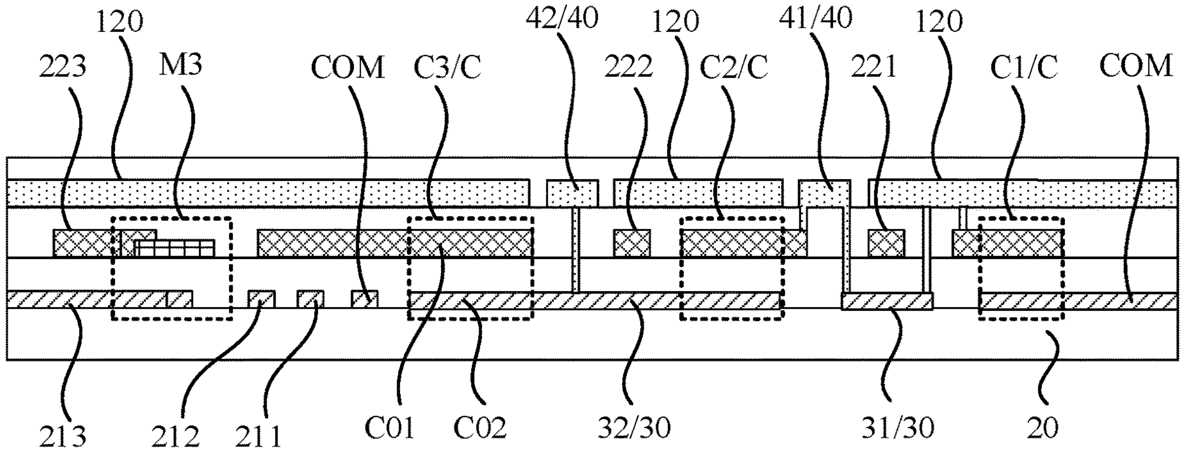
FIG. 22 is a sectional view of the pixel unit of FIG. 21 taken along a direction HH'.

FIG. 21 is another top view illustrating the structure of a pixel unit according to an embodiment of the present disclosure. FIG. 22 is a sectional view of the pixel unit of FIG. 21 taken along a direction HH'. Referring to FIGS. 21 and 22, the microfluidic substrate includes the fixed potential line COM. The capacitor C includes the first capacitor C1, and the lower plate C02 of the first capacitor C1 is electrically connected to the fixed potential line COM in the same layer. The upper plate C01 of the first capacitor C1 is electrically connected to the pixel electrode 120.

For example, referring to FIGS. 21 and 22, the fixed potential line COM extend along the first direction, and the fixed potential line COM is in the same layer as the scan lines (including the first scan line 211 and the second scan line 212). Thus, the fixed potential line COM is electrically connected to the lower plate C02 of the first capacitor C1 in the same layer.

For example, referring to FIGS. 7 and 8, the upper plate C01 of the first capacitor C1 is electrically connected to the fixed potential line COM, the upper plate C01 of the second capacitor C2 is electrically connected to the lower plate C02 of the first capacitor C1, the lower plate C02 of the third capacitor C3 is electrically connected to the lower plate C02 of the second capacitor C2, and the upper plate C01 of the third capacitor C3 is electrically connected to the first electrode of the third transistor M3.

In other embodiments, the upper plate C01 of the first capacitor C1 is electrically connected to the fixed potential line COM, the lower plate C02 of the second capacitor C2 is electrically connected to the lower plate C02 of the first capacitor C1, the lower plate C02 of the third capacitor C3 is electrically connected to the upper plate C01 of the second capacitor C2, and the upper plate C01 of the third capacitor C3 is electrically connected to the first electrode of the third transistor M3.

In some embodiments, the lower plate C02 of the third capacitor C3 instead of the upper plate C01 of the third capacitor C3 may be electrically connected to the first electrode of the third transistor M3.

Figure 23:
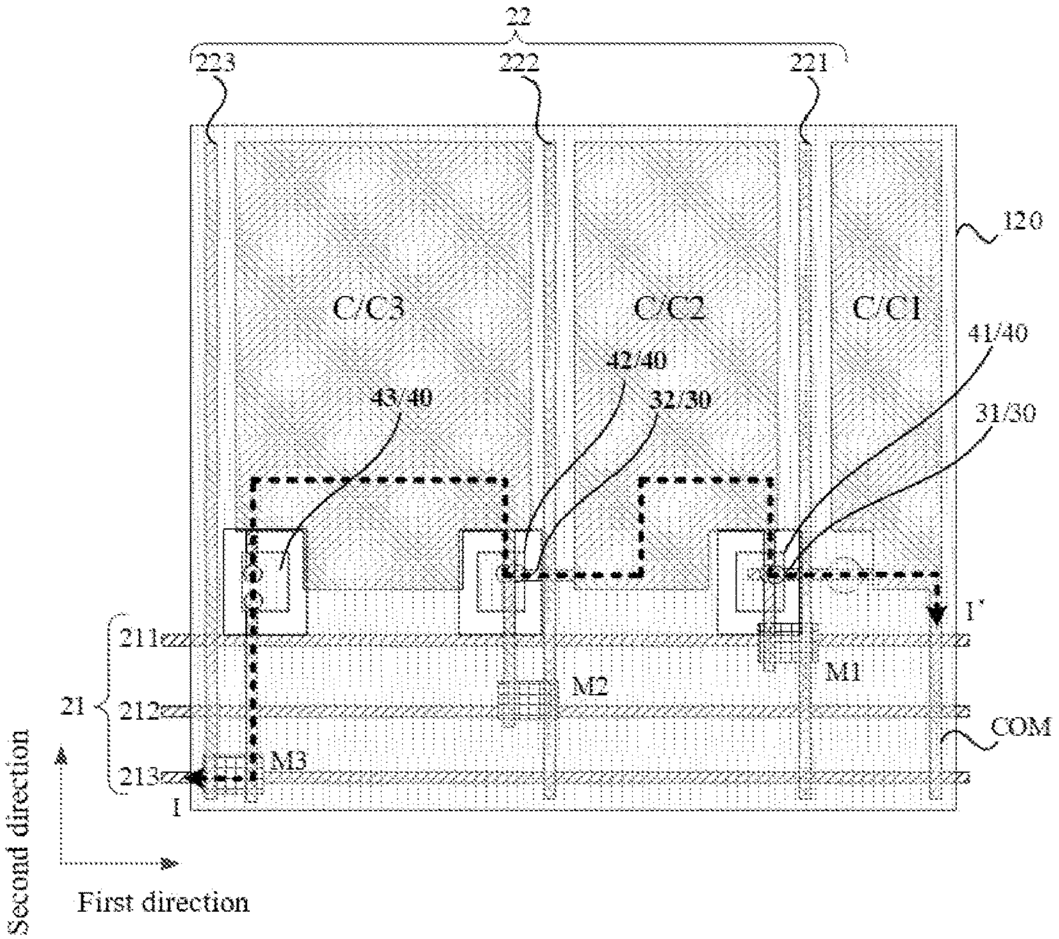
FIG. 23 is another top view illustrating the structure of a pixel unit according to an embodiment of the present disclosure.
Figure 24:
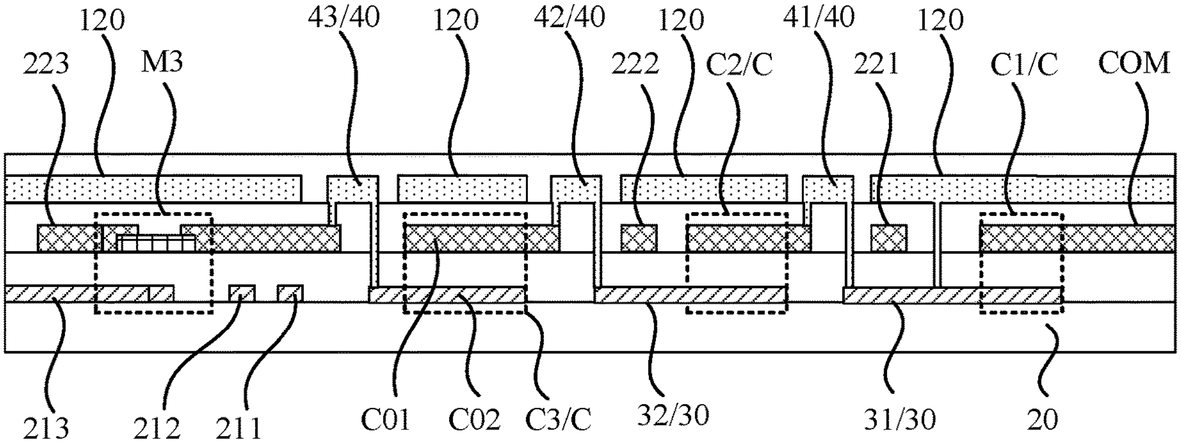
FIG. 24 is a sectional view of the pixel unit of FIG. 23 taken along a direction II'.

FIG. 23 is another top view illustrating the structure of a pixel unit according to an embodiment of the present disclosure. FIG. 24 is a sectional view of the pixel unit of FIG. 23 taken along a direction II'. Referring to FIGS. 23 and 24, the microfluidic substrate includes the fixed potential line COM. The capacitor C includes the first capacitor C1, the second capacitor C2, and the third capacitor C3. The upper plate C01 of the first capacitor C1 is electrically connected to the fixed potential line COM, the upper plate C01 of the second capacitor C2 is electrically connected to the lower plate C02 of the first capacitor C1, and the upper plate C01 of the third capacitor C3 is electrically connected to the lower plate C02 of the second capacitor C2.

For example, referring to FIGS. 23 and 24, the lower plate C02 of the third capacitor C3 and the first electrode of the third transistor M3 are in different layers. The bridge 40 includes a third bridge 43 connecting the lower plate C02 of the third capacitor C3 to the first electrode of the third transistor M3.

In some embodiments, referring to FIGS. 7 and 8, the microfluidic substrate includes the scan line unit 21. The scan line unit 21 includes the n scan lines arranged along the second direction. Along the second direction, all the scan lines in the same scan line unit 21 are disposed on the same side of the capacitor C.

For example, referring to FIGS. 7 and 8, the case where n=3 is taken as an example, the scan line unit 21 includes the first scan line 211, the second scan line 212, and the third scan line 213. The first scan line 211, the second scan line 212, and the third scan line 213 are disposed on the same side of the capacitor C (including the first capacitor C1, the second capacitor C2, and the third capacitor C3). In this manner, the openings of the pixel electrode 120 are arranged correspondingly on the same side of the capacitor C.

Figure 25:
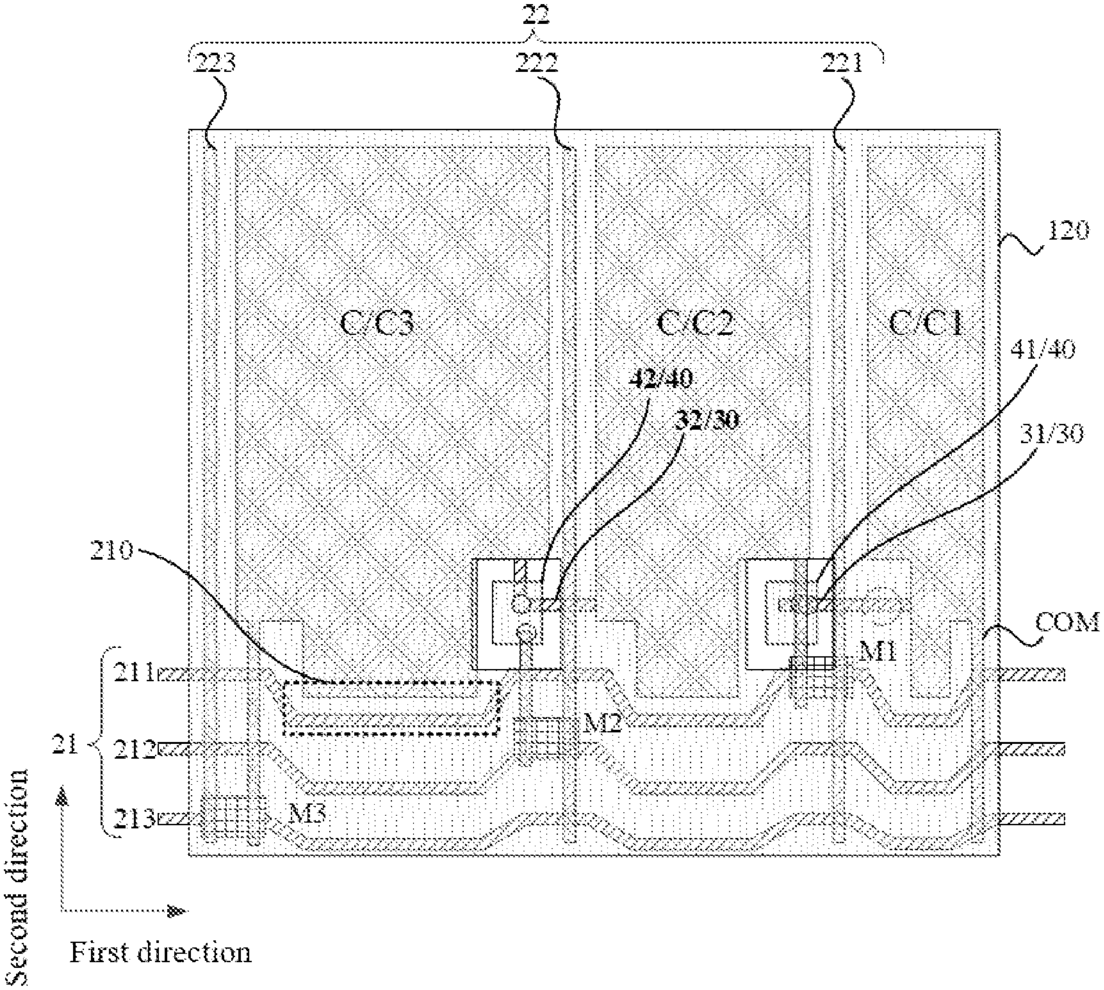
FIG. 25 is another top view illustrating the structure of a pixel unit according to an embodiment of the present disclosure.

FIG. 25 is another top view illustrating the structure of a pixel unit according to an embodiment of the present disclosure. Referring to FIG. 25, each of the scan lines includes a capacitor avoidance portion 210, where a vertical projection of the capacitor avoidance portion 210 on the substrate 20 does not overlap a vertical projection of a respective capacitor C on the substrate 20. That is to say, the vertical projection of the capacitor avoidance portion 210 on the substrate 20 does not overlap the vertical projection of the capacitor C on the substrate 20. In the embodiment of the present disclosure, the capacitor avoidance portion 210 is provided for reserving a space for the position of the capacitor C towards the scan lines. A distance between adjacent scan lines corresponding to the position of the capacitor C is reduced, thereby increasing the area of the capacitor C. On the premise that the capacitance value of the capacitor C is set, the area of the pixel unit 100 can be reduced so that the number of pixel units 100 in a unit area can be increased, thereby increasing the pixel resolution.

In some embodiments, referring to FIGS. 6 to 8, the microfluidic substrate includes the scan line unit 21 and the data line unit 22. The data line unit 22 includes the n data lines arranged along the first direction. The scan line unit 21 includes the n scan lines arranged along the second direction. Microfluidic pixel driving circuits 110 arranged in one row along the first direction are electrically connected to the same scan line unit 21, and microfluidic pixel driving circuits 110 arranged in one column along the second direction are electrically connected to the same data line unit 22. The pixel unit 100 (including the microfluidic pixel driving circuit 110 and the pixel electrode 120) is provided at an intersection between the scan line unit 21 and the data line unit 22.

Figure 26:
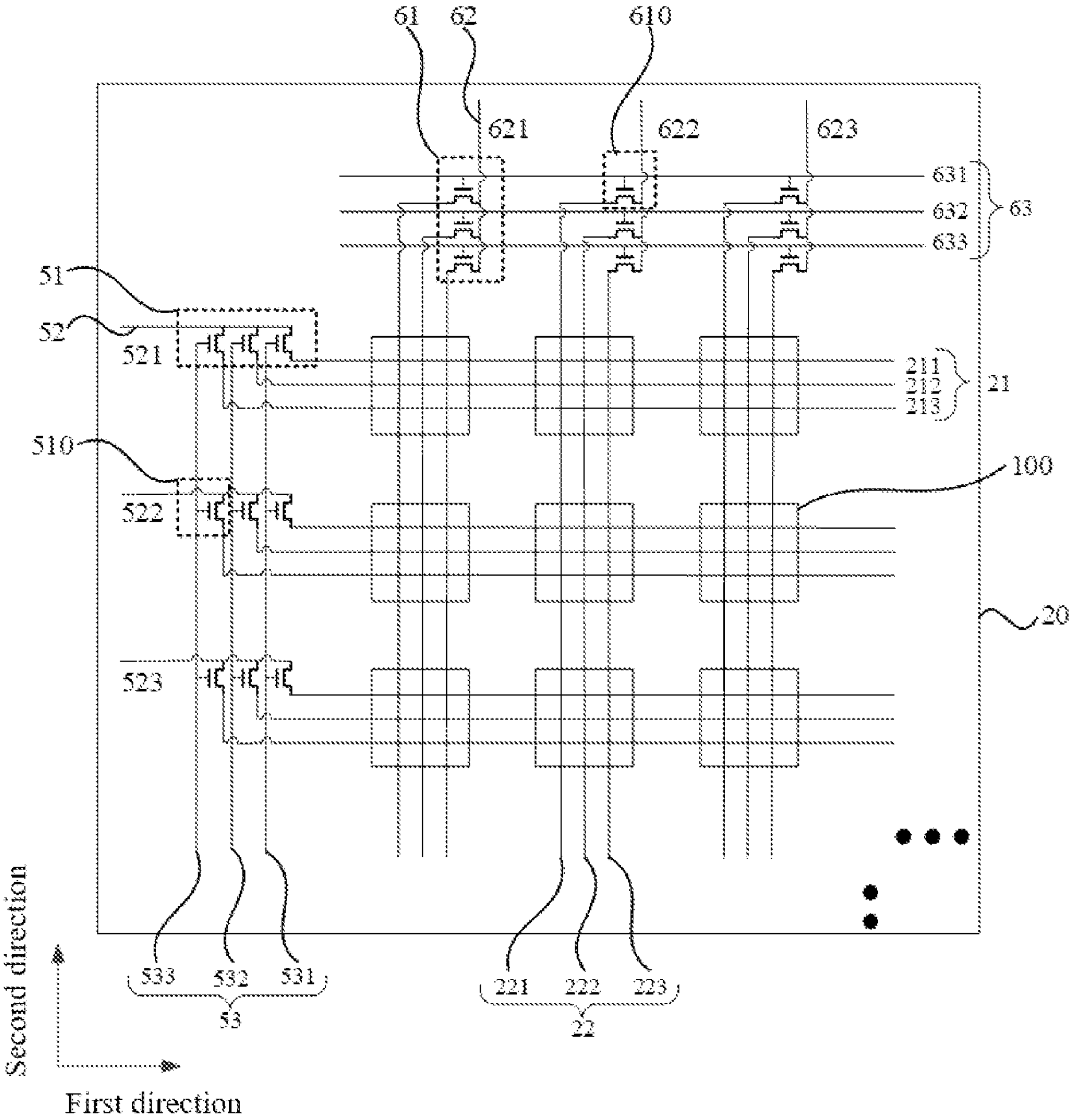
FIG. 26 is another top view illustrating the structure of a microfluidic substrate according to an embodiment of the present disclosure.

FIG. 26 is another top view illustrating the structure of a microfluidic substrate according to an embodiment of the present disclosure. Referring to FIG. 26, the microfluidic substrate includes multiple scan selection circuits 51, multiple scan source signal lines 52, and n scan control signal lines 53. Each scan selection circuit 51 includes n scan selection units 510. First terminals of the n scan selection units 510 in the same scan selection circuit 51 are electrically connected to the same scan source signal line 52, control terminals of the n scan selection units 510 are electrically connected in one-to-one correspondence to the n scan control signal lines 53, and second terminals of the n scan selection units 510 are electrically connected in one-to-one correspondence to the n scan lines. When a scan selection unit 510 is turned on under the control of an enable level of a scan control signal line 53 connected to the scan selection unit 510, an electrical signal on the scan source signal line 52 is transmitted to a scan line connected to the scan selection unit 510. In the embodiment of the present disclosure, the scan selection circuits 51 and the scan control signal lines 53 are provided, the same scan source signal line 52 is controlled by the scan control signal lines 53 to provide electrical signals for different scan lines separately, and the number of scan source signal lines 52 is 1/n of the number of scan lines, thereby reducing the number of scan source signal lines 52 and reducing the number of ports of a driver chip.

For example, referring to FIG. 26, the case where n=3 is taken as an example, the microfluidic substrate includes three scan control signal lines 53, and the three scan control signal lines 53 are denoted as a first scan control signal line 531, a second scan control signal line 532, and a third scan control signal line 533, separately. The scan selection circuit 51 includes three scan selection units 510. A control terminal of a first scan selection circuit 510 is electrically connected to the first scan control signal line 531, a first terminal of the first scan selection unit 510 is electrically connected to the scan source signal line 52, and a second terminal of the first scan selection unit 510 is electrically connected to the first scan line 211. A control terminal of a second scan selection circuit 510 is electrically connected to the second scan control signal line 532, a first terminal of the second scan selection unit 510 is electrically connected to the scan source signal line 52, and a second terminal of the second scan selection unit 510 is electrically connected to the second scan line 212. A control terminal of a third scan selection circuit 510 is electrically connected to the third scan control signal line 533, a first terminal of the third scan selection unit 510 is electrically connected to the scan source signal line 52, and a second terminal of the third scan selection unit 510 is electrically connected to the third scan line 213.

In some embodiments, referring to FIG. 26, the microfluidic substrate includes multiple data selection circuits 61, multiple data source signal lines 62, and n data control signal lines 63. Each data selection circuit 61 includes n data selection units 610. First terminals of the n data selection units 610 in the same data selection circuit 61 are electrically connected to the same data source signal line 62, control terminals of the n data selection units 610 are electrically connected in one-to-one correspondence to the n data control signal lines 63, and second terminals of the n data selection units 610 are electrically connected in one-to-one correspondence to the n data lines. When a data selection unit 610 is turned on under the control of an enable level of a data control signal line 63 connected to the data selection unit 610, an electrical signal on the data source signal line 62 is transmitted to a data line connected to the data selection unit 610. In the embodiment of the present disclosure, the data selection circuits 61 and the data control signal lines 63 are provided, the same data source signal line 62 is controlled by the data control signal lines 63 to provide electrical signals for different data lines separately, and the number of data source signal lines 62 is 1/n of the number of data lines, thereby reducing the number of data source signal lines 62 and reducing the number of ports of the driver chip.

For example, referring to FIG. 26, the case where n=3 is taken as an example, the microfluidic substrate includes three data control signal lines 63, and the three data control signal lines 63 are denoted as a first data control signal line 631, a second data control signal line 632, and a third data control signal line 633, separately. The data selection circuit 61 includes three data selection units 610. A control terminal of a first data selection circuit 610 is electrically connected to the first data control signal line 631, a first terminal of the first data selection unit 610 is electrically connected to the data source signal line 62, and a second terminal of the first data selection unit 610 is electrically connected to the first data line 221. A control terminal of a second data selection circuit 610 is electrically connected to the second data control signal line 632, a first terminal of the second data selection unit 610 is electrically connected to the data source signal line 62, and a second terminal of the second data selection unit 610 is electrically connected to the second data line 222. A control terminal of a third data selection circuit 610 is electrically connected to the third data control signal line 633, a first terminal of the third data selection unit 610 is electrically connected to the data source signal line 62, and a second terminal of the third data selection unit 610 is electrically connected to the third data line 223.

Figure 27:
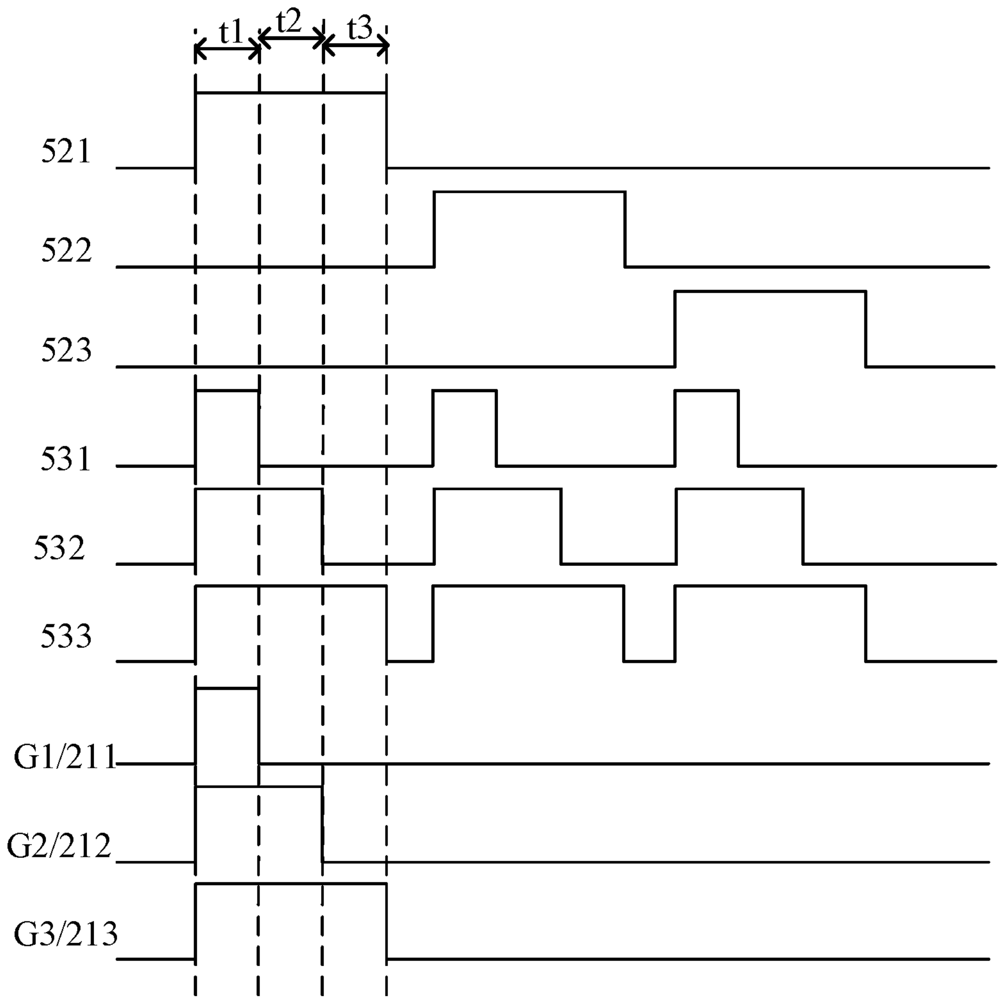
FIG. 27 is a drive timing diagram of a microfluidic substrate according to an embodiment of the present disclosure.

FIG. 27 is a drive timing diagram of a microfluidic substrate according to an embodiment of the present disclosure. Referring to FIGS. 26 and 27, a drive timing includes a first period t1 and a second period t2 that are set in sequence. In the first period t1, an enable level of the first scan control signal line 531 is used to control the scan selection unit 510 connected to the first scan control signal line 531 to be turned on to transmit an enable level of the scan source signal line 52 to the first scan line 211, and an enable level of the second scan control signal line 532 is used to control the scan selection unit 510 connected to the second scan control signal line 532 to be turned on to transmit the enable level of the scan source signal line 52 to the second scan line 212.

In the second period t2, a disable level of the first scan control signal line 531 is used to control the scan selection unit 510 connected to the first scan control signal line 531 to be turned off, and the enable level of the second scan control signal line 532 is used to control the scan selection unit 510 connected to the second scan control signal line 532 to be turned on to transmit the enable level of the scan source signal line 52 to the second scan line 212.

Thus, in the first period t1, the enable level of the scan source signal line 52 is transmitted to the first scan line 211, and the first scan line 211 transmits an enable level of the first scan signal G1. In the first period t1 and the second period t2, the enable level of the scan source signal line 52 is transmitted to the second scan line 212, and the second scan line 212 transmits an enable level of the second scan signal G2.

In some embodiments, referring to FIGS. 3, 26, and 27, the drive timing further includes a third period t3, where the third period t3 is after the second period t2, and the second period t2 is after the first period t1. In the first period t1 and the second period t2, an enable level of the third scan control signal line 533 is used to control the scan selection unit 510 connected to the third scan control signal line 533 to be turned on to transmit the enable level of the scan source signal line 52 to the third scan line 213.

In the third period t3, the disable level of the first scan control signal line 531 is used to control the scan selection unit 510 connected to the first scan control signal line 531 to be turned off, a disable level of the second scan control signal line 532 is used to control the scan selection unit 510 connected to the second scan control signal line 532 to be turned off, and the enable level of the third scan control signal line 533 is used to control the scan selection unit 510 connected to the third scan control signal line 533 to be turned on to transmit the enable level of the scan source signal line 52 to the third scan line 213.

Thus, in the first period t1, the second period t2, and the third period t3, the enable level of the scan source signal line 52 is transmitted to the third scan line 213, and the third scan line 213 transmits an enable level of the third scan signal G3.

In another embodiment, in the first period t1, a disable level of the third scan control signal line 533 is used to control the scan selection unit 510 connected to the third scan control signal line 533 to be turned off. In the second period t2, the enable level of the third scan control signal line 533 is used to control the scan selection unit 510 connected to the third scan control signal line 533 to be turned on to transmit the enable level of the scan source signal line 52 to the third scan line 213. Thus, the drive timing of the third scan signal G3 shown in FIG. 4 is formed.

In one other embodiment, in the first period t1, the enable level of the third scan control signal line 533 is used to control the scan selection unit 510 connected to the third scan control signal line 533 to be turned on to transmit the enable level of the scan source signal line 52 to the third scan line 213. In the second period t2, the disable level of the third scan control signal line 533 is used to control the scan selection unit 510 connected to the third scan control signal line 533 to be turned off. Thus, the drive timing of the third scan signal G3 shown in FIG. 5 is formed.

For example, referring to FIGS. 26 and 27, the multiple scan source signal lines 52 include a first scan source signal line 521, a second scan source signal line 522, and a third scan source signal line 523. An enable level of the first scan source signal line 521, an enable level of the second scan source signal line 522, and an enable level of the third scan source signal line 523 occur in sequence.

Figure 28:
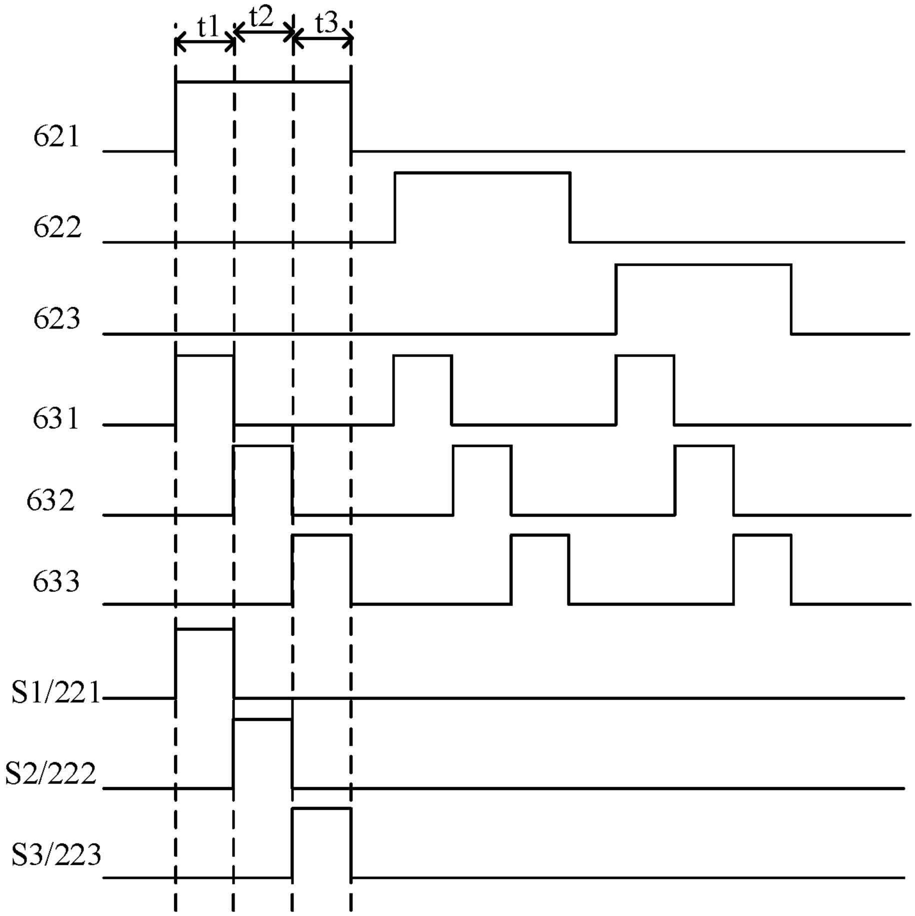
FIG. 28 is another drive timing diagram of a microfluidic substrate according to an embodiment of the present disclosure.

FIG. 28 is another drive timing diagram of a microfluidic substrate according to an embodiment of the present disclosure. Referring to FIGS. 26 and 28, the drive timing includes the first period t1 and the second period t2 that are set in sequence. In the first period t1, an enable level of the first data control signal line 631 is used to control the data selection unit 610 connected to the first data control signal line 631 to be turned on to transmit an enable level of the data source signal line 62 to the first data line 221, and a disable level of the second data control signal line 632 is used to control the data selection unit 610 connected to the second data control signal line 632 to be turned off.

In the second period t2, a disable level of the first data control signal line 631 is used to control the data selection unit 610 connected to the first data control signal line 631 to be turned off, and an enable level of the second data control signal line 632 is used to control the data selection unit 610 connected to the second data control signal line 632 to be turned on to transmit the enable level of the data source signal line 62 to the second data line 222.

Thus, in the first period t1, the enable level of the data source signal line 62 is transmitted to the first data line 221, and the first data line 221 transmits an enable level of the first data signal S1. In the second period t2, the enable level of the data source signal line 62 is transmitted to the second data line 222, and the second data line 222 transmits an enable level of the second data signal S2.

In some embodiments, referring to FIGS. 3, 26, and 28, the drive timing further includes the third period t3, where the third period t3 is after the second period t2, and the second period t2 is after the first period t1. In the first period t1 and the second period t2, a disable level of the third data control signal line 633 is used to control the data selection unit 610 connected to the third data control signal line 633 to be turned off.

In the third period t3, the disable level of the first data control signal line 631 is used to control the data selection unit 610 connected to the first data control signal line 631 to be turned off, the disable level of the second data control signal line 632 is used to control the data selection unit 610 connected to the second data control signal line 632 to be turned off, and an enable level of the third data control signal line 633 is used to control the data selection unit 610 connected to the third data control signal line 633 to be turned on to transmit the enable level of the data source signal line 62 to the third data line 223.

Thus, in the third period t3, the enable level of the data source signal line 62 is transmitted to the third data line 223, and the third data line 223 transmits an enable level of the third data signal S3.

For example, referring to FIGS. 26 and 28, the multiple data source signal lines 62 include a first data source signal line 621, a second data source signal line 622, and a third data source signal line 623. An enable level of the first data source signal line 621, an enable level of the second data source signal line 622, and an enable level of the third data source signal line 623 occur in sequence.

Figure 29:
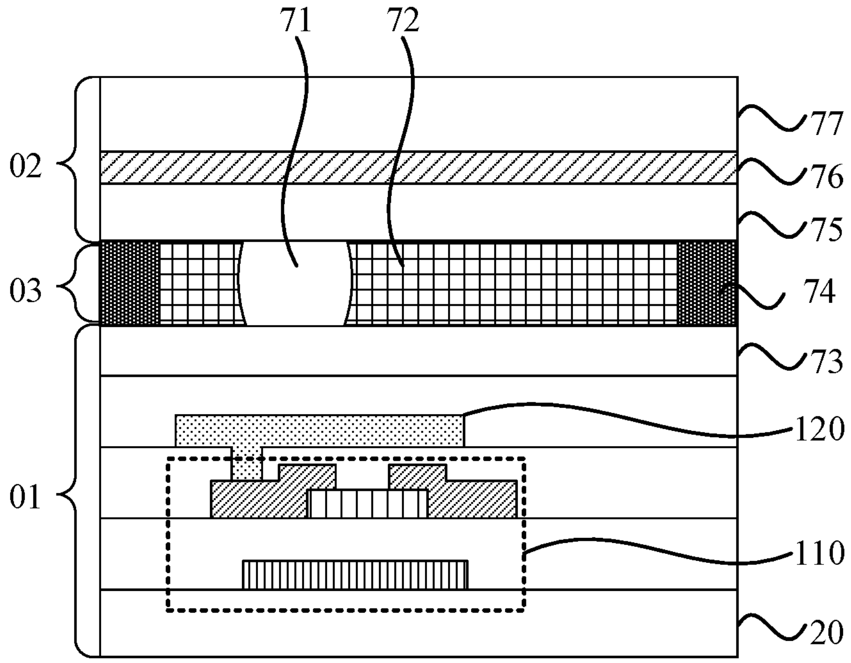
FIG. 29 is a sectional view illustrating the structure of a microfluidic chip according to an embodiment of the present disclosure.

FIG. 29 is a sectional view illustrating the structure of a microfluidic chip according to an embodiment of the present disclosure. Referring to FIG. 29, the microfluidic chip includes a microfluidic substrate 01, an opposing substrate 02, and a channel layer 03. The channel layer 03 is disposed between the opposing substrate 02 and the microfluidic substrate 01 and used for accommodating a droplet 71.

For example, referring to FIG. 29, the microfluidic substrate 01 includes a first hydrophobic layer 73 disposed between a pixel electrode 120 and the channel layer 03. The opposing substrate 02 includes an opposing substrate 77, an opposing electrode 76, and a second hydrophobic layer 75, where the opposing electrode 76 is disposed between the opposing substrate 77 and the second hydrophobic layer 75, and the second hydrophobic layer 75 is disposed between the opposing electrode 76 and the channel layer 03. An electric field for driving the droplet 71 to move is formed between the opposing substrate 02 and the pixel electrode 120.

In one embodiment, the opposing electrode 76 may be grounded. In another embodiment, the opposing electrode 80 may be electrically connected to a fixed potential line COM.

For example, referring to FIG. 29, the channel layer 03 includes a hydrophobic oil droplet 72 and a spacer layer 74, where the spacer layer 74 is disposed between the microfluidic substrate 01 and the opposing substrate 02, the spacer layer 74 forms a closed space with the microfluidic substrate 01 and the opposing substrate 02, and the closed space is used for accommodating the droplet 71 and the hydrophobic oil droplet 72. The hydrophobic oil droplet 72 functions as a lubricant to facilitate the movement of the droplet 71. The hydrophobic oil droplet 72 wraps the droplet 71 to prevent the volatilization of the droplet 71.

It is to be noted that the preceding are only preferred embodiments of the present disclosure and the technical principles used therein. It is to be understood by those skilled in the art that the present disclosure is not limited to the embodiments described herein. For those skilled in the art, various apparent modifications, adaptations, combinations, and substitutions can be made without departing from the scope of the present disclosure. Therefore, while the present disclosure is described in detail through the preceding embodiments, the present disclosure is not limited to the preceding embodiments and may include more equivalent embodiments without departing from the concept of the present disclosure. The scope of the present disclosure is determined by the scope of the appended claims.

What is claimed is:

1. A microfluidic pixel driving circuit, comprising n boost modules, wherein each of the n boost modules comprises a capacitor and a write unit, a capacitor in a first boost module of the n boost modules is denoted as a first capacitor, a write unit in the first one of the n boost modules is denoted as a first write unit, a capacitor in a second boost module of the n boost modules is denoted as a second capacitor, a write unit in the second one of the n boost modules is denoted as a second write unit, and n is a positive integer greater than or equal to 2;

a first terminal of the first capacitor is electrically connected to a fixed potential line, a second terminal of the first capacitor is electrically connected to a pixel electrode, and the first capacitor is used for storing a voltage of the pixel electrode;

the first write unit is configured to write a first data signal to the pixel electrode according to an enable level of a first scan signal;

a first terminal of the second capacitor is electrically connected to the pixel electrode; and the second write unit is configured to write a second data signal to a second terminal of the second capacitor according to an enable level of a second scan signal; and wherein the first write unit comprises a first transistor, a gate of the first transistor configured to receive the first scan signal, a first electrode of the first transistor is electrically connected to the pixel electrode, and a second electrode of the first transistor configured to receive the first data signal; and the second write unit comprises a second transistor, a gate of the second transistor configured to receive the second scan signal, a first electrode of the second transistor is electrically connected to the second terminal of the second capacitor, and a second electrode of the second transistor configured to receive the second data signal; and wherein a capacitor in an m-th boost module of the n boost modules is connected in series between a write unit in the m-th boost module and a write unit in an (m−1)-th boost module of the n boost modules, wherein $2 \le m \le n$; and a voltage $V_{p,tn}$ of the pixel electrode after n-stage boosting satisfies that wherein $V_{SH}$ denotes a high-level data signal and $V_{SL}$ denotes a low-level data signal.

2. The microfluidic pixel driving circuit according to claim 1, further comprising:

a third capacitor, wherein a first terminal of the third capacitor is electrically connected to the second terminal of the second capacitor; and a third write unit configured to write a third data signal to a second terminal of the third capacitor according to an enable level of a third scan signal; and wherein the third write unit comprises a third transistor, a gate of the third transistor configured to receive the third scan signal, a first electrode of the third transistor is electrically connected to the second terminal of the third capacitor, and a second electrode of the third transistor configured to receive the third data signal.

3. The microfluidic pixel driving circuit according to claim 1, wherein a drive timing of the microfluidic pixel driving circuit comprises a first period and a second period that are set in sequence;

in the first period, the enable level of the first scan signal is used to control the first write unit to be turned on to write the first data signal to the pixel electrode, and the enable level of the second scan signal is used to control the second write unit to be turned on to write a first voltage value of the second data signal to the second terminal of the second capacitor; and in the second period, a disable level of the first scan signal is used to control the first write unit to be turned off, and the enable level of the second scan signal is used to control the second write unit to be turned on to write a second voltage value of the second data signal to the second terminal of the second capacitor;

wherein the second voltage value is greater than the first voltage value.

4. The microfluidic pixel driving circuit according to claim 3, further comprising:

a third capacitor, wherein a first terminal of the third capacitor is electrically connected to the second terminal of the second capacitor; and a third write unit configured to write a third data signal to a second terminal of the third capacitor according to an enable level of a third scan signal;

wherein the drive timing further comprises a third period after the second period;

in at least one of the first period or the second period, the enable level of the third scan signal is used to control the third write unit to be turned on to write a third voltage value of the third data signal to the second terminal of the third capacitor; and in the third period, the disable level of the first scan signal is used to control the first write unit to be turned off, a disable level of the second scan signal is used to control the second write unit to be turned off, and the enable level of the third scan signal is used to control the third write unit to be turned on to write a fourth voltage value of the third data signal to the second terminal of the third capacitor;

wherein the fourth voltage value is greater than the third voltage value.

5. The microfluidic pixel driving circuit according to claim 1, wherein a second terminal of the capacitor in the m-th boost module of the n boost modules is electrically connected to a write unit in the m-th boost module, and a first terminal of the capacitor in the m-th boost module is electrically connected to a write unit in the (m−1)-th boost module of the n boost modules, wherein 2≤m≤n; and a capacitance value of the capacitor in the m-th boost module is greater than a capacitance value of a capacitor in the (m−1)-th boost module.

6. The microfluidic pixel driving circuit according to claim 5, wherein the write unit in the m-th boost module and the write unit in the (m−1)-th boost module each comprises a transistor; and a channel width-to-length ratio of the transistor in the m-th boost module is greater than a channel width-to-length ratio of the transistor in the (m−1)-th boost module.

7. A microfluidic substrate, comprising a substrate and a pixel unit on a side of the substrate;

wherein the pixel unit comprises a microfluidic pixel driving circuit and a pixel electrode, and the microfluidic pixel driving circuit is electrically connected to the pixel electrode, and wherein the microfluidic pixel driving circuit comprises n boost modules, each of the n boost modules comprises a capacitor and a write unit, a capacitor in a first boost module of the n boost modules is denoted as a first capacitor, a write unit in the first one of the n boost modules is denoted as a first write unit, a capacitor in a second boost module of the n boost modules is denoted as a second capacitor, a write unit in the second one of the n boost modules is denoted as a second write unit, and n is a positive integer greater than or equal to 2;

a first terminal of the first capacitor is electrically connected to a fixed potential line, a second terminal of the first capacitor is electrically connected to a pixel electrode, and the first capacitor is used for storing a voltage of the pixel electrode;

the first write unit is configured to write a first data signal to the pixel electrode according to an enable level of a first scan signal;

a first terminal of the second capacitor is electrically connected to the pixel electrode; and the second write unit is configured to write a second data signal to a second terminal of the second capacitor according to an enable level of a second scan signal; and wherein the first write unit comprises a first transistor, a gate of the first transistor configured to receive the first scan signal, a first electrode of the first transistor is electrically connected to the pixel electrode, and a second electrode of the first transistor configured to receive the first data signal; and the second write unit comprises a second transistor, a gate of the second transistor configured to receive the second scan signal, a first electrode of the second transistor is electrically connected to the second terminal of the second capacitor, and a second electrode of the second transistor configured to receive the second data signal; and wherein a lower plate of the first capacitor is electrically connected to the fixed potential line in a same layer; or, wherein an upper plate of the first capacitor is electrically connected to the fixed potential line, an upper plate of the second capacitor is electrically connected to a lower plate of the first capacitor, and an upper plate of a third capacitor of the n boost modules is electrically connected to a lower plate of the second capacitor.

8. The microfluidic substrate according to claim 7, comprising a scan line unit and a data line unit;

wherein the data line unit comprises n data lines arranged along a first direction, and the scan line unit comprises n scan lines arranged along a second direction, wherein the first direction intersects the second direction;

wherein a capacitor of each of the n boost modules comprises an upper plate and a lower plate, wherein in a direction perpendicular to the substrate, the lower plate is disposed between the substrate and the upper plate, and the upper plate is disposed between the pixel electrode and the lower plate; and wherein the upper plate is in a same layer as the data lines and the lower plate is in a same layer as the scan lines.

9. The microfluidic substrate according to claim 8, comprising a fixed potential line; wherein an upper plate of the first capacitor is electrically connected to the fixed potential line; wherein the upper plate of the first capacitor is in a same layer as the fixed potential line;

wherein an upper plate of the second capacitor is electrically connected to a lower plate of the first capacitor.

10. The microfluidic substrate according to claim 9, wherein a lower plate of a third capacitor of the n boost module is electrically connected to a lower plate of the second capacitor;

wherein a second data line of the n data lines is used to provide the second data signal; and along the first direction, a vertical projection of the second data line on the substrate is located between a vertical projection of the second capacitor on the substrate and a vertical projection of the third capacitor on the substrate;

wherein the microfluidic substrate further comprises a connection line, the connection line overlaps the second data line in different layers, and the connection line is used to connect the lower plate of the second capacitor to the lower plate of the third capacitor;

wherein a second scan line of the n scan lines is used to provide the second scan signal; and the gate of the second transistor is electrically connected to the second scan line, the second electrode of the second transistor is electrically connected to the second data line in a same layer, and the microfluidic substrate further comprises a bridge, the bridge is used to connect the connection line to the first electrode of the second transistor;

wherein a third data line of the n data lines further is used to provide a third data signal; and along the first direction, a vertical projection of the third data line on the substrate is located on a side of a vertical projection of the third capacitor on the substrate facing away from a vertical projection of the second capacitor on the substrate; and wherein a third scan line of the n scan lines is used to provide a third scan signal; and a third write unit comprises a third transistor, wherein a gate of the third transistor is electrically connected to the third scan line, a first electrode of the third transistor is electrically connected to an upper plate of the third capacitor in a same layer, and a second electrode of the third transistor is electrically connected to the third data line in a same layer.

11. The microfluidic substrate according to claim 9, wherein a first data line of the n data lines is used to provide the first data signal; and along the first direction, a vertical projection of the first data line on the substrate is located between a vertical projection of the first capacitor on the substrate and a vertical projection of the second capacitor on the substrate;

wherein the microfluidic substrate further comprises a connection line and a bridge, the connection line overlaps the first data line in different layers, a first terminal of the connection line is electrically connected to the lower plate of the first capacitor; and the bridge is used to connect a second terminal of the connection line to the upper plate of the second capacitor; and wherein a first scan line of the n scan lines is used to provide the first scan signal; and the gate of the first transistor is electrically connected to the first scan line, the first electrode of the first transistor is electrically connected to the bridge, and the second electrode of the first transistor is electrically connected to the first data line in a same layer.

12. The microfluidic substrate according to claim 7, comprising a scan line unit, wherein the scan line unit comprises n scan lines arranged along a second direction; and along the second direction, all the n scan lines in a same scan line unit are disposed on a same side of a capacitor; and wherein each of the n scan lines comprises a capacitor avoidance portion, wherein a vertical projection of the capacitor avoidance portion on the substrate does not overlap a vertical projection of a respective capacitor of the n boost modules on the substrate.

13. The microfluidic substrate according to claim 7, comprising a scan line unit and a data line unit;

wherein the data line unit comprises n data lines arranged along a first direction, and the scan line unit comprises n scan lines arranged along a second direction, wherein the first direction intersects the second direction; and wherein microfluidic pixel driving circuits arranged in one row along the first direction are electrically connected to a same scan line unit, and microfluidic pixel driving circuits arranged in one column along the second direction are electrically connected to a same data line unit.

14. The microfluidic substrate according to claim 13, comprising a plurality of scan selection circuits, a plurality of scan source signal lines, and n scan control signal lines;

wherein each of the plurality of scan selection circuits comprises n scan selection units, first terminals of the n scan selection units in a same scan selection circuit are electrically connected to a same scan source signal line, control terminals of the n scan selection units are electrically connected in one-to-one correspondence to the n scan control signal lines, and second terminals of the n scan selection units are electrically connected in one-to-one correspondence to the n scan lines;

wherein the n scan lines comprise a first scan line and a second scan line; the n scan control signal lines comprise a first scan control signal line and a second scan control signal line; a drive timing of the microfluidic pixel driving circuit comprises a first period and a second period that are set in sequence; in the first period, an enable level of the first scan control signal line is used to control a scan selection unit connected to the first scan control signal line to be turned on to transmit an enable level of the scan source signal line to the first scan line, and an enable level of the second scan control signal line is used to control a scan selection unit connected to the second scan control signal line to be turned on to transmit the enable level of the scan source signal line to the second scan line; and in the second period, a disable level of the first scan control signal line is used to control the scan selection unit connected to the first scan control signal line to be turned off, and the enable level of the second scan control signal line is used to control the scan selection unit connected to the second scan control signal line to be turned on to transmit the enable level of the scan source signal line to the second scan line; and wherein the n scan lines further comprise a third scan line, and the n scan control signal lines further comprise a third scan control signal line; the drive timing further comprises a third period after the second period; in at least one of the first period or the second period, an enable level of the third scan control signal line is used to control a scan selection unit connected to the third scan control signal line to be turned on to transmit the enable level of the scan source signal line to the third scan line; and in the third period, the disable level of the first scan control signal line is used to control the scan selection unit connected to the first scan control signal line to be turned off, a disable level of the second scan control signal line is used to control the scan selection unit connected to the second scan control signal line to be turned off, and the enable level of the third scan control signal line is used to control the scan selection unit connected to the third scan control signal line to be turned on to transmit the enable level of the scan source signal line to the third scan line.

15. The microfluidic substrate according to claim 13, comprising a plurality of data selection circuits, a plurality of data source signal lines, and n data control signal lines;

wherein each of the plurality of data selection circuits comprises n data selection units, first terminals of the n data selection units in a same data selection circuit are electrically connected to a same data source signal line, control terminals of the n data selection units are electrically connected in one-to-one correspondence to the n data control signal lines, and second terminals of the n data selection units are electrically connected in one-to-one correspondence to the n data lines;

wherein the n data lines comprise a first data line and a second data line; the n data control signal lines comprise a first data control signal line and a second data control signal line; a drive timing of the microfluidic pixel driving circuit comprises a first period and a second period that are set in sequence; in the first period, an enable level of the first data control signal line is used to control a data selection unit connected to the first data control signal line to be turned on to transmit an enable level of the data source signal line to the first data line, and a disable level of the second data control signal line is used to control a data selection unit connected to the second data control signal line to be turned off; and in the second period, a disable level of the first data control signal line is used to control the data selection unit connected to the first data control signal line to be turned off, and an enable level of the second data control signal line is used to control the data selection unit connected to the second data control signal line to be turned on to transmit the enable level of the data source signal line to the second data line; and wherein the n data lines further comprise a third data line, and the n data control signal lines further comprise a third data control signal line; the drive timing further comprises a third period after the second period; in the first period and the second period, a disable level of the third data control signal line is used to control a data selection unit connected to the third data control signal line to be turned off; and in the third period, the disable level of the first data control signal line is used to control the data selection unit connected to the first data control signal line to be turned off, the disable level of the second data control signal line is used to control the data selection unit connected to the second data control signal line to be turned off, and an enable level of the third data control signal line is used to control the data selection unit connected to the third data control signal line to be turned on to transmit the enable level of the data source signal line to the third data line.

16. A microfluidic chip, comprising a microfluidic substrate, an opposing substrate, and a channel layer, wherein the channel layer is disposed between the opposing substrate and the microfluidic substrate and used for accommodating droplets;

wherein the microfluidic substrate comprises a substrate and a pixel unit on a side of the substrate;

wherein the pixel unit comprises a microfluidic pixel driving circuit and a pixel electrode, and the microfluidic pixel driving circuit is electrically connected to the pixel electrode; and wherein the microfluidic pixel driving circuit comprises n boost modules, each of the n boost modules comprises a capacitor and a write unit, a capacitor in a first boost module of the n boost modules is denoted as a first capacitor, a write unit in the first one of the n boost modules is denoted as a first write unit, a capacitor in a second boost module of the n boost modules is denoted as a second capacitor, a write unit in the second one of the n boost modules is denoted as a second write unit, and n is a positive integer greater than or equal to 2;

a first terminal of the first capacitor is electrically connected to a fixed potential line, a second terminal of the first capacitor is electrically connected to a pixel electrode, and the first capacitor is used for storing a voltage of the pixel electrode;

the first write unit is configured to write a first data signal to the pixel electrode according to an enable level of a first scan signal;

a first terminal of the second capacitor is electrically connected to the pixel electrode; and the second write unit is configured to write a second data signal to a second terminal of the second capacitor according to an enable level of a second scan signal; and wherein the first write unit comprises a first transistor, a gate of the first transistor configured to receive the first scan signal, a first electrode of the first transistor is electrically connected to the pixel electrode, and a second electrode of the first transistor configured to receive the first data signal; and the second write unit comprises a second transistor, a gate of the second transistor configured to receive the second scan signal, a first electrode of the second transistor is electrically connected to the second terminal of the second capacitor, and a second electrode of the second transistor configured to receive the second data signal; and wherein a capacitor in an m-th boost module of the n boost modules is connected in series between a write unit in the m-th boost module and a write unit in an (m−1)-th boost module of the n boost modules, wherein 2≤m≤n; and a voltage $V_{p,tn}$ of the pixel electrode after n-stage boosting satisfies that wherein $V_{SH}$ denotes a high-level data signal and $V_{SL}$ denotes a low-level data signal.

* * * * *